(12) United States Patent
Menguy et al.

(10) Patent No.: US 9,817,195 B2
(45) Date of Patent: Nov. 14, 2017

(54) CABLE SEALING DEVICE

(71) Applicant: BM INNOVATIVE PROPERTIES COMPANY, St. Paul, MN (US)

(72) Inventors: Michel T. Menguy, Le Relecq-Kerhuon (FR); Thomas Cavallaro, Missillac (FR)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 15/257,034

(22) Filed: Sep. 6, 2016

(65) Prior Publication Data

US 2017/0102507 A1    Apr. 13, 2017

Related U.S. Application Data

(60) Provisional application No. 62/240,619, filed on Oct. 13, 2015.

(51) Int. Cl.
| | |
|---|---|
| G02B 6/36 | (2006.01) |
| G02B 6/38 | (2006.01) |
| G02B 6/42 | (2006.01) |
| G02B 6/44 | (2006.01) |

(52) U.S. Cl.
CPC .......... *G02B 6/3887* (2013.01); *G02B 6/387* (2013.01); *G02B 6/3897* (2013.01); *G02B 6/4248* (2013.01); *G02B 6/4444* (2013.01); *G02B 6/3825* (2013.01)

(58) Field of Classification Search
CPC .... G02B 6/387; G02B 6/3821; G02B 6/3825; G02B 6/3849; G02B 6/3869; G02B 6/3871; G02B 6/3887; G02B 6/3894; G02B 6/3897; G02B 6/4248; G02B 6/4444

USPC ..................................................... 385/53–87
See application file for complete search history.

(56) References Cited

U.S. PATENT DOCUMENTS

| | | | |
|---|---|---|---|
| 7,268,299 B2 | 9/2007 | Allen | |
| 7,744,288 B2 | 6/2010 | Lu | |
| 8,038,356 B2* | 10/2011 | Marcouiller | G02B 6/3869 |
| | | | 385/76 |
| 2011/0044588 A1 | 2/2011 | Larson | |

(Continued)

FOREIGN PATENT DOCUMENTS

| | | |
|---|---|---|
| EP | 2 770 358 A1 | 8/2014 |
| WO | WO 2014/139102 | 9/2014 |

OTHER PUBLICATIONS

International Search Report for PCT/IB2016/055934, mailed on Dec. 22, 2016, 4 pp.

*Primary Examiner* — Akm Enayet Ullah
*Assistant Examiner* — Michael Mooney
(74) *Attorney, Agent, or Firm* — Janet A. Kling

(57) ABSTRACT

A cable sealing device is described herein for use in a sealed optical fiber connector that includes a spreading member disposed around and axially movable with respect to a cable and elastic sleeve concentrically disposed around the cable and over the spreading member. The elastic sleeve includes a first cable sealing portion disposed in fixed sealing contact with the cable, a central sealing portion that is axially offset from the first cable sealing portion and concentrically arranged around the spreading member, and a first flexible membrane portion disposed between the first cable sealing portion and the central sealing portion.

18 Claims, 18 Drawing Sheets

(56) References Cited

U.S. PATENT DOCUMENTS

2013/0077928 A1 3/2013 Hsing
2014/0355936 A1 12/2014 Bund et al.

* cited by examiner

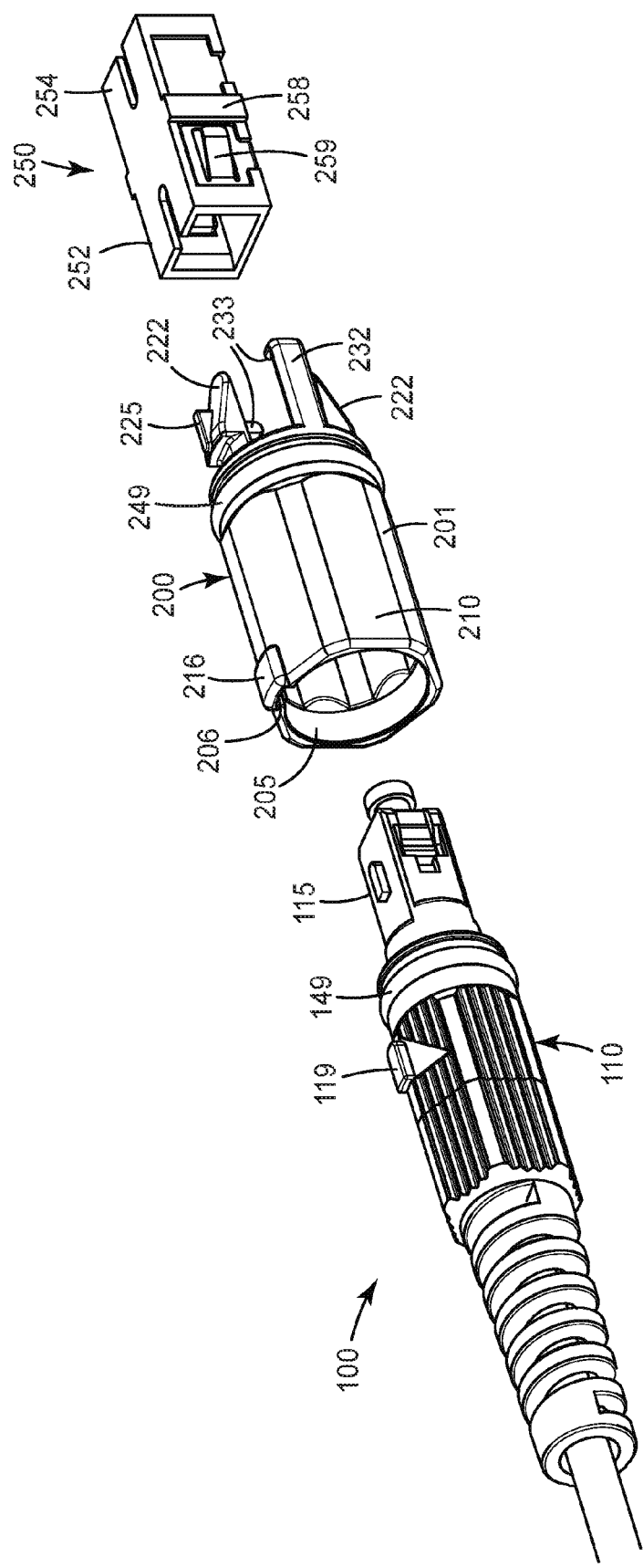

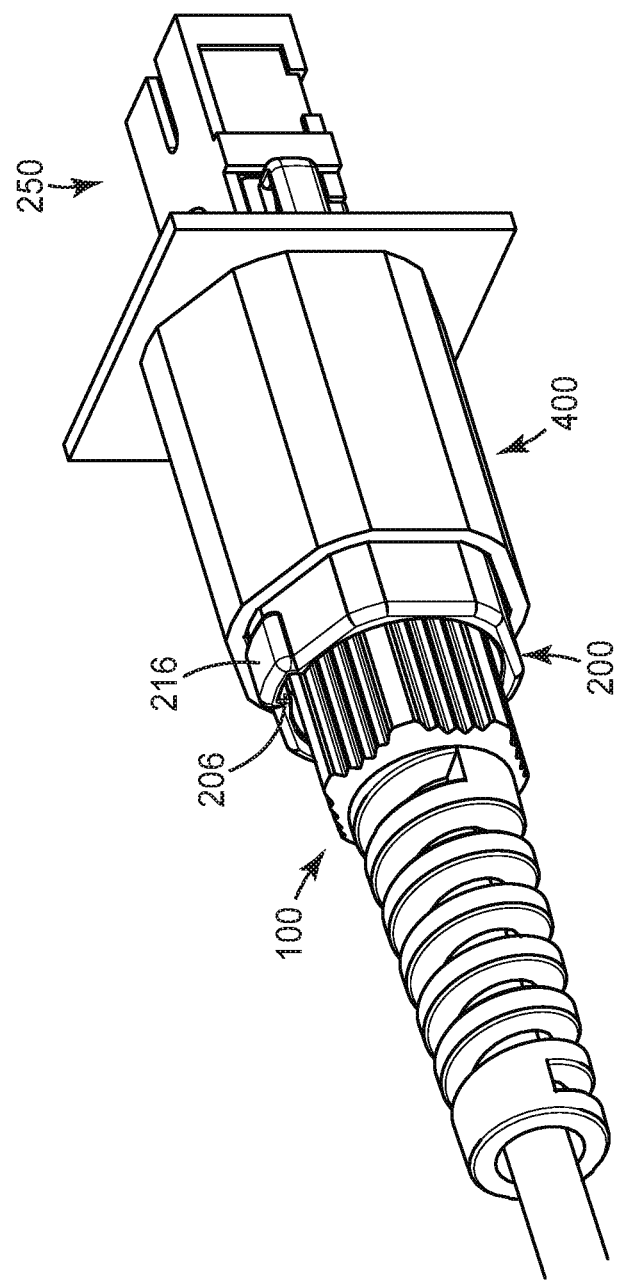

CABLE SEALING DEVICE

FIELD OF THE INVENTION

The present invention relates to a cable sealing member to improve the sealing performance between the cable and a hardened optical fiber connector or inlet device for use with telecommunication enclosures.

BACKGROUND OF THE INVENTION

Telecommunication cables are ubiquitous and used for distributing all manner of data across vast networks. The majority of cables are electrically conductive cables (typically copper), although the use of optical fiber cables is growing rapidly in telecommunication systems as larger and larger amounts of data are transmitted. Additionally, as data transmissions increase, the fiber optic network is being extended closer to the end user which can be a premise, business, or a private residence.

As telecommunication cables are routed across data networks, it is necessary to periodically open the cable so that one or more telecommunication lines therein may be spliced, thereby allowing data to be distributed to other cables or "branches" of the telecommunication network. At each point where a telecommunication cable is opened, it is necessary to provide a telecommunication enclosure to protect the exposed interior of the cable. The cable branches may be further distributed until the network reaches individual homes, businesses, offices, and so on. These networks are often referred to as fiber to the X (FTTX) networks which can include fiber to the premise (FTTP), fiber to the home (FTTH) and fiber to the antenna (FTTA) networks.

In an FTTH network, optical fiber is brought to the end user and connected to the optical network terminal (ONT) unit mounted on a wall or elsewhere in the premises of the end user. For example, in a home or living unit of an apartment or other multi-dwelling structure, the ONT may be located near the television, on a desk, or near the telephone. The ONT converts this optical signal into conventional electrical signals to provide voice (telephone), Internet (data), video signals and/or wireless signals (WIFI) the end user.

Fiber terminals are one type of telecommunication enclosure that is typically located near an end user in a FTTP or FTTH network to distribute the final service to the end user. Typical fiber terminals are designed to drop services (to provide service connections) to a small number of premises having typically between four to sixteen end users. The last service connection from the fiber terminal is made to the ONT, located at the end user using a drop cable. Ruggedized optical connectors attached to the terminal ends of optical fiber drop cables are gaining popularity for quick, reliable field service connections. Because fiber terminals are generally outdoors, the optical fiber connectors used must provide an environmental seal between the terminal and the connector housing as well as between the connector housing and the drop cable.

In many instances, conventional grommets are a common means of providing a seal between the drop cable and the connector housing. External forces exerted on the cable can result in migration of water into either the connector housing or even into the fiber terminal which over time could result in loss in the transmitted signal. The penetration of moisture and/or humidity into an otherwise close system can be exacerbated when the drop cable can move axially with respect to the connector housing. A more reliable alternative sealing means is needed to improve the water tightness of these ruggedized connectors.

SUMMARY OF THE INVENTION

In a first embodiment, a cable sealing device is described herein for use in a sealed optical fiber connector. A cable defines axial and radial directions for the device. The cable sealing device includes a spreading member arranged around the cable and axially movable relative to the cable, and an elastic sleeve concentrically disposed around the cable and over the spreading member. When disposed in place over the cable and the spreading member, the elastic sleeve includes a first cable sealing portion of the elastic sleeve that is disposed in fixed sealing contact with the cable, a central sealing portion of the elastic sleeve that is axially offset from the first cable sealing portion and concentrically arranged around the spreading member, and a first flexible membrane portion disposed between the first cable sealing portion and the central sealing portion. In an exemplary aspect, the spreading member is maintained in a fixed position relative to a connector housing of the sealed optical fiber connector such that the central sealing portion is in sealing contact with the connector housing.

In a second embodiment, a sealed optical fiber connector comprises a connector housing having an interior cavity extending from a first end to a second end of the connector housing and a shell portion integrally formed at the first end of the connector housing, and an optical connection portion mounted on a terminal end of an optical fiber cable and secured in the shell portion of the connector housing and a cable sealing member disposed on the cable adjacent to the optical connection portion. The cable sealing device includes a spreading member arranged around the cable and axially movable relative to the cable and an elastic sleeve concentrically disposed around the cable and over the spreading member. When disposed in place over the cable and the spreading member, the elastic sleeve includes a first cable sealing portion of the elastic sleeve that is disposed in fixed sealing contact with the cable, a central sealing portion of the elastic sleeve that is axially offset from the first cable sealing portion and concentrically arranged around the spreading member, and a first flexible membrane portion disposed between the first cable sealing portion and the central sealing portion. In an exemplary aspect, the spreading member is maintained in a fixed position relative to a connector housing of the sealed optical fiber connector such that the central sealing portion is in sealing contact with the connector housing.

In a third embodiment, a system for making a sealed optical connection through the port in a bulkhead, wherein the bulkhead has at least one port structure disposed therein. A sealed optical fiber connector is mounted in the port structure, wherein the connector comprises a connector housing having an interior cavity extending from a first end to a second end of the connector housing and a shell portion integrally formed at the first end of the connector housing, and an optical connection portion mounted on a terminal end of an optical fiber cable and secured in the shell portion of the connector housing and a cable sealing member disposed on the cable adjacent to the optical connection portion. The cable sealing device includes a spreading member arranged around the cable and axially movable relative to the cable and an elastic sleeve concentrically disposed around the cable and over the spreading member. When disposed in place over the cable and the spreading member, the elastic sleeve includes a first cable sealing portion of the elastic sleeve that is disposed in fixed sealing contact with the cable, a central sealing portion of the elastic sleeve that is axially offset from the first cable sealing portion and concentrically arranged around the spreading member, and a first flexible membrane portion disposed between the first cable sealing portion and the central sealing portion. In an exemplary aspect, the spreading member is maintained in a fixed position relative to a connector housing of the sealed optical fiber connector such that the central sealing portion is in sealing contact with the connector housing.

In a third embodiment, a kit of parts for a field mounted sealed optical fiber connector is described that is suitable to assemble on an optical fiber cable in the field. The kit of parts includes a connector housing having an interior cavity extending from a first end to a second end of the connector housing and a shell portion integrally formed at the first end of the connector housing, a field mountable optical connection portion that can be secured in the shell portion of the connector housing, a spread member, positioned around the cable such as to be axially movable relative to the cable; and an expandable elastic sleeve of generally tubular shape. The elastic sleeve is configured to be concentrically arranged around the cable such that it is in fixed sealing contact with the cable in a first cable sealing portion of the elastic sleeve, and to be concentrically arranged around the spreader in a central sealing portion of the elastic sleeve that is axially offset from the first cable sealing portion, and a first flexible membrane portion disposed between the first cable sealing portion and the central sealing portion. The spreading member is maintained in a fixed position relative when assembled into the connector housing such that the central sealing portion is in sealing contact with the connector housing.

The above summary of the present invention is not intended to describe each illustrated embodiment or every implementation of the present invention. The figures and the detailed description that follows more particularly exemplify these embodiments.

BRIEF DESCRIPTION OF THE DRAWINGS

The present invention will be further described with reference to the accompanying drawings, wherein:

FIGS. 4A-4B are two views of accessories that can be used with the first exemplary ruggedized optical fiber connector to make an optical connection with another optical fiber connector (not shown);

FIGS. 7A-7D are four views of showing the exemplary ruggedized optical fiber connector and accessories mounted in the port structure of FIG. 6A.

Figure 1A:
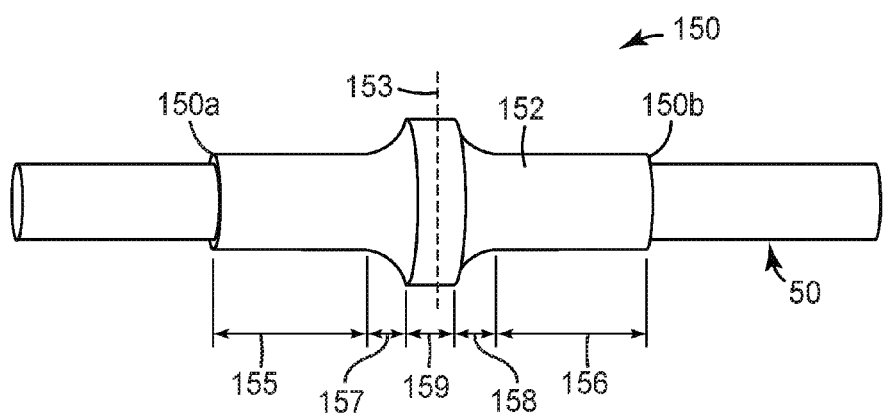
FIGS. 1A-1C show three views of a first embodiment of an exemplary cable sealing device to be used in a ruggedized optical fiber connector according to an aspect of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF THE DRAWINGS

In the following detailed description of the preferred embodiments, reference is made to the accompanying drawings, which illustrate specific embodiments in which the invention may be practiced. The illustrated embodiments are not intended to be exhaustive of all embodiments according to the invention. It is to be understood that other embodiments may be utilized and structural or logical changes may be made without departing from the scope of the present invention. The following detailed description, therefore, is not to be taken in a limiting sense, and the scope of the present invention is defined by the appended claims.

When connecting optical fibers, the engagement forces between the optical fibers and/or between the ferrules which hold the optical fibers must be controlled. If too little force is applied, the optical connection may be unreliable or may be lossy. If too much force is applied, the terminal end of the optical fiber may chip which can result in degraded signal transmission performance. For this reason, most conventional optical fiber connectors include a resilient member or spring to control the axial connection forces.

Ruggedized optical fiber connectors fall into two broad categories. In the first group of ruggedized optical fiber connectors, the drop cable is rigidly fixed with respect to the connector housing and the control of the axial connection forces is transferred to a hardened receptacle which includes a resilient compensating member such as a spring loaded receptacle. These ruggedized fixed cable connectors generally have a specialized connection format which cannot be directly mated with a conventional optical fiber couplings such as a SC format couplings, an LC format coupling, etc. without the addition of a supplemental accessory disposed at the extremity of the ruggedized connector.

The second category of ruggedized connectors are configured to mate with conventional optical fiber connector in a standard format optical fiber coupling. In these ruggedized connectors, the backbones of the connectors are resiliently connected to the connector housing which means that the drop cable can move axially with respect to the connector housing.

The exemplary cable sealing device described herein is designed to improve the sealing performance between the drop cable and the housing of ruggedized connector designs which allow the drop cable to move with respect to the connector housing. The new sealing solution described in the present disclosure is based on an elastic sleeve that creates a soft membrane seal to allow sliding movement between the connector housing and the cable terminated by the ruggedized connector while maintaining a high level of water tightness (e.g. International Protection Marking 68 or IP68).

Figure 1B:
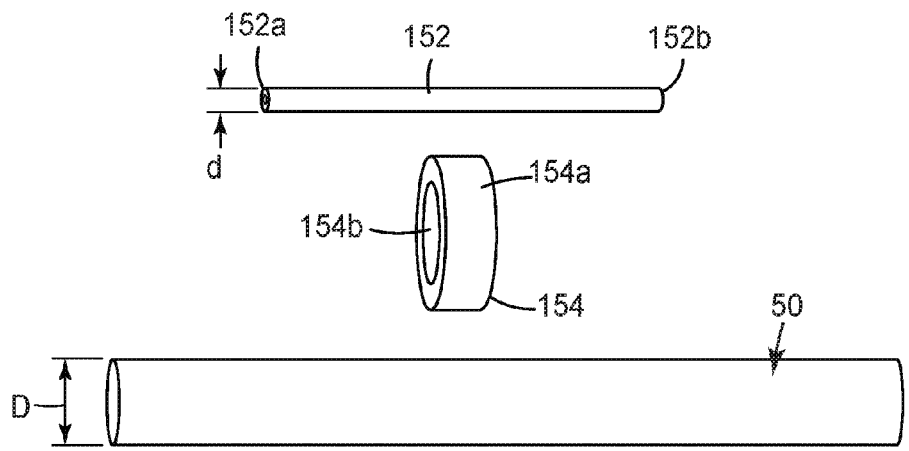
Figure 1C:
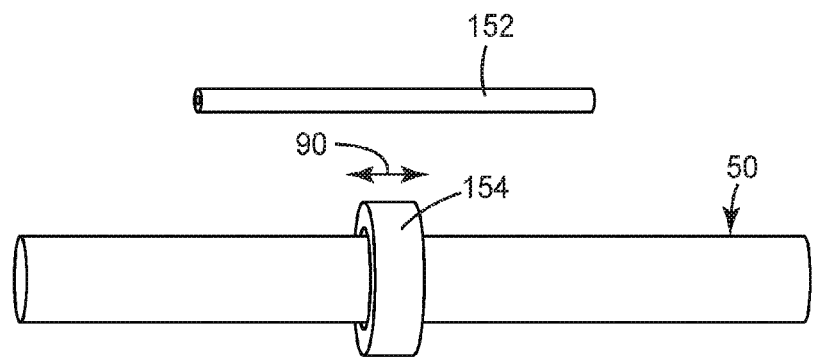

Referring to FIGS. 1A-1C, the exemplary cable sealing device 150 comprises a spreading member, such as rigid washer 154 that fits loosely over the outer circumference of the cable 50 being terminated and an expandable elastic sleeve 152 which is positioned over the spreading member. The internal, unexpanded diameter, d, of the elastic sleeve is less than the diameter, D, of the cable being terminated, but which can stretch to fit over the rigid washer. In one exemplary aspect, the elastic sleeve can have a diameter that is between 0.5D to about 0.8D and which can stretch elastically by at least 150%. The first and second ends 152a, 152b of the elastic sleeve will try to recover to their original unexpanded diameter, d, squeezing tightly around the circumference of the cable to provide a seal between the elastomeric sleeve and the cable.

In one exemplary embodiment, the elastic sleeve can be polychloroprene rubber sleeve such as a HELAVIA® standard sleeve or a silicone rubber sleeve such as a SILAVIA® standard sleeve, both available from SES®STERLING SA (France).

In one exemplary embodiment, rigid washer 154 has a body 154a having an external shape that closely fits the interior cavity of the ruggedized connector housing 110 (FIGS. 2A-2B and FIG. 3B for example) into which it will be inserted and an interior bore 154b extending through the body that is a little larger than the cable passing through the bore so that the cable can slide back and forth with respect to the rigid washer as indicated by bidirectional arrow 90. The external shape can be circular, elliptical, rectangular or other shape that corresponds to the cross-sectional shape of the interior cavity of the ruggedized connector housing into which it will be inserted. The shape of the bore can be circular, elliptical, rectangular or other shape that corresponds to the external cross-sectional profile of the cable that will be inserted therethrough. In an exemplary aspect, the rigid washer can be made as a single piece or a plurality of pieces which can be easily assembled into a ring shaped piece. The rigid washer can be made of a hard structural plastic or metal.

In one exemplary embodiment (see e.g. FIG. 3B), the cable 50 can be a fiber optic cable. The fiber optic cable typically includes a semi-rigid outer sheath or jacket 52 surrounding at least one optical fiber 54 and can include one or more strength members 58. The optical fibers may be enclosed in one or more loose buffer tubes or may be provided as one or more optical fiber ribbon cables. One to twelve optical fibers may reside in the loose buffer tube surrounded by a water-blocking gel or grease. Each of the ribbon cables may have from one to about twenty-four optical fibers. Each optical fiber has a polymeric coating 55 that surrounds and protects the glass fiber 56. Examples of exemplary optical fiber cables include ResiLink ADF™ All-Dielectric Flat Drop Cable available from Pirelli Cables and Systems (Columbia, N.C.) or EZ DROP cable from Draka (Claremont, N.C.), fiber reinforced plastic (FRP) optical cable available from Shenzhen SDG Information Company, Ltd. (Shenzhen, China), SE*-LW*FTTH All Purpose Optical Drop Cables and SE-8 PureAccess™ Single Mode Optical Fiber each of which is available from Sumitomo Electric (Research Triangle Park, NC), Mini DP Flat Drop Cable available from OFS (Northcross, Ga.). The strength members may be either semi-rigid rods or a collection of loose fibers or floss, e.g. made of aramid fibers or glass.

The combined outer circumference of the rigid washer 154 disposed under elastic sleeve 152 of exemplary cable sealing device 150 should be slightly larger than cross-sectional shape of the interior cavity of the ruggedized connector housing into which it will be inserted so that the sealing device fits snugly within the cavity. In other words, the rigid washer will be held in a fixed position relative to the connector housing of the ruggedized connector when an external force is applied to cable 50.

To assemble the exemplary cable sealing device 150, the elastic sleeve can be fitted on to an expansion tool (not shown). The rigid washer is slid over the end of the optical fiber cable to an appropriate axial position. The expansion tool is engaged to stretch the elastic sleeve so that it is opened to a diameter greater than the diameter of the washer. The cable and rigid washer are inserted through the open elastic sleeve such that the washer is roughly centered under the elastic sleeve. The tool is released allowing the elastic sleeve to contract around the cable and the washer and the tool is extracted to leave the exemplary cable sealing device disposed near the terminal end of the cable as shown in FIG. 1A.

Figure 2A:
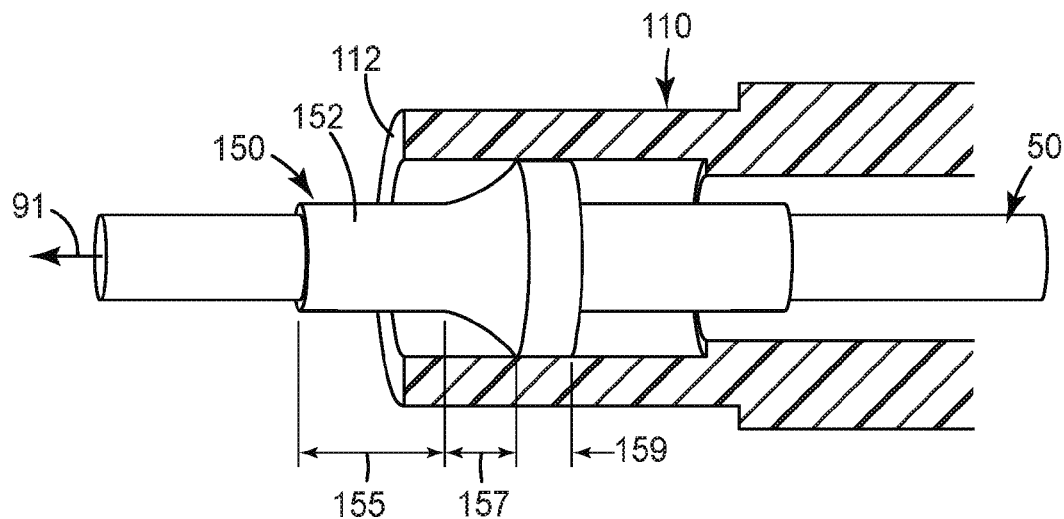
FIGS. 2A-2B are two schematic views showing how the exemplary cable sealing device of FIGS. 1A-1C responds to external forces exerted on a cable passing through said cable sealing device.
Figure 2B:
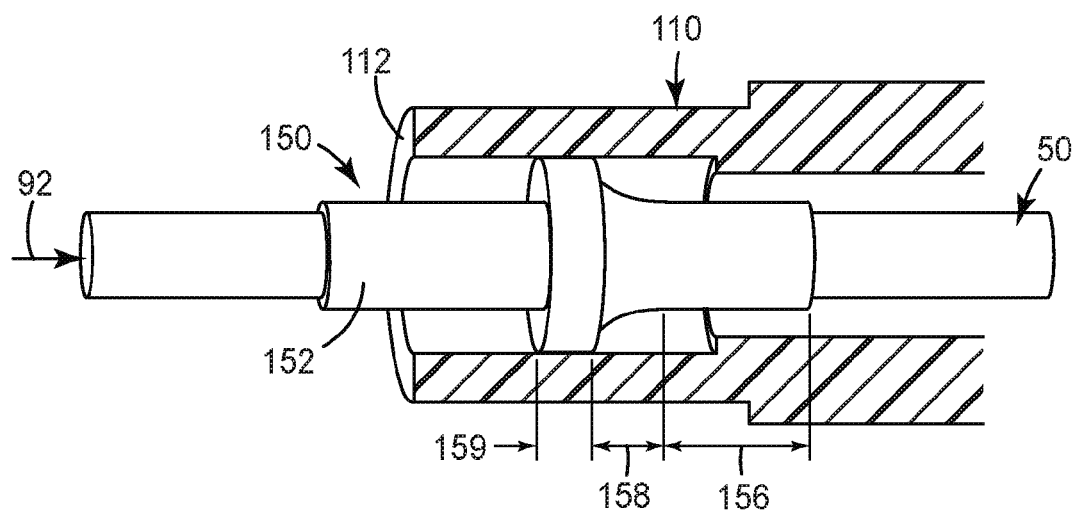

The exemplary cable sealing device 150 has a first end 150a near the terminal end of the cable and a second end 150b opposite the first end. The rigid washer 154 is disposed under the elastic sleeve 152 at or near the mid-plane of the elastic sleeve (denoted by dashed line 153 in FIG. 1A). The cable sealing device is characterized by first and second cable sealing portions 155, 156 disposed adjacent to the first and second end of the sleeve, respectively. The first and second cable sealing portions have a fixed position on the cable. The central portion 159 of the elastic sleeve that is disposed over the rigid washer is fixed relative to the washer and the connector housing into which the cable sealing device is inserted. Thus, the cable sealing device is fixed relative to the connector housing 110 of the ruggedized optical fiber connector once the sealing device is installed in said connector as shown in FIGS. 2A and 2B. Between the first cable sealing portion and the rigid washer, the elastic sleeve forms a first flexible membrane portion 157, and between the rigid washer and the second cable sealing portion, the elastic sleeve forms a second flexible membrane portion 158. The first and second flexible membrane portions allow the cable to move relative to the housing of the ruggedized connector which in turn allows the backbone of the connection portion of the ruggedized connector to move with respect to the connector housing of the ruggedized connector.

FIG. 2A shows how the membrane responds when the cable is pulled away from the connector housing 110 (indicated by arrow 91), and FIG. 2B shows how the membrane responds when the cable is pushed toward the connector housing. Movements of this kind can occur when a person actually pulls or pushes the cable in question, when the cable outside of the connector is blown by wind, if ice accumulates on the cable, pulling force can be exerted on the cable. In another aspect, the exemplary cable sealing device allows the connection interface of the optical connector to be resiliently coupled to the connector housing of a ruggedized optical connector. The resilient coupling of two connectors ensures better signal transmission performance and is needed for optimal performance. Up to now, ruggedized connector manufacturers have been building this resiliency into specialized receptacles, often having a spring loaded receptacle ferrule to overcome issues that can arise when the resiliency is built into the ruggedized connector itself. Having a cable sealing mechanism that can accommodate the resiliency in a ruggedized connector allows use of standard optical fiber couplings when mating the ruggedized connector with this sealing mechanism to another optical fiber connector.

Figure 3A:
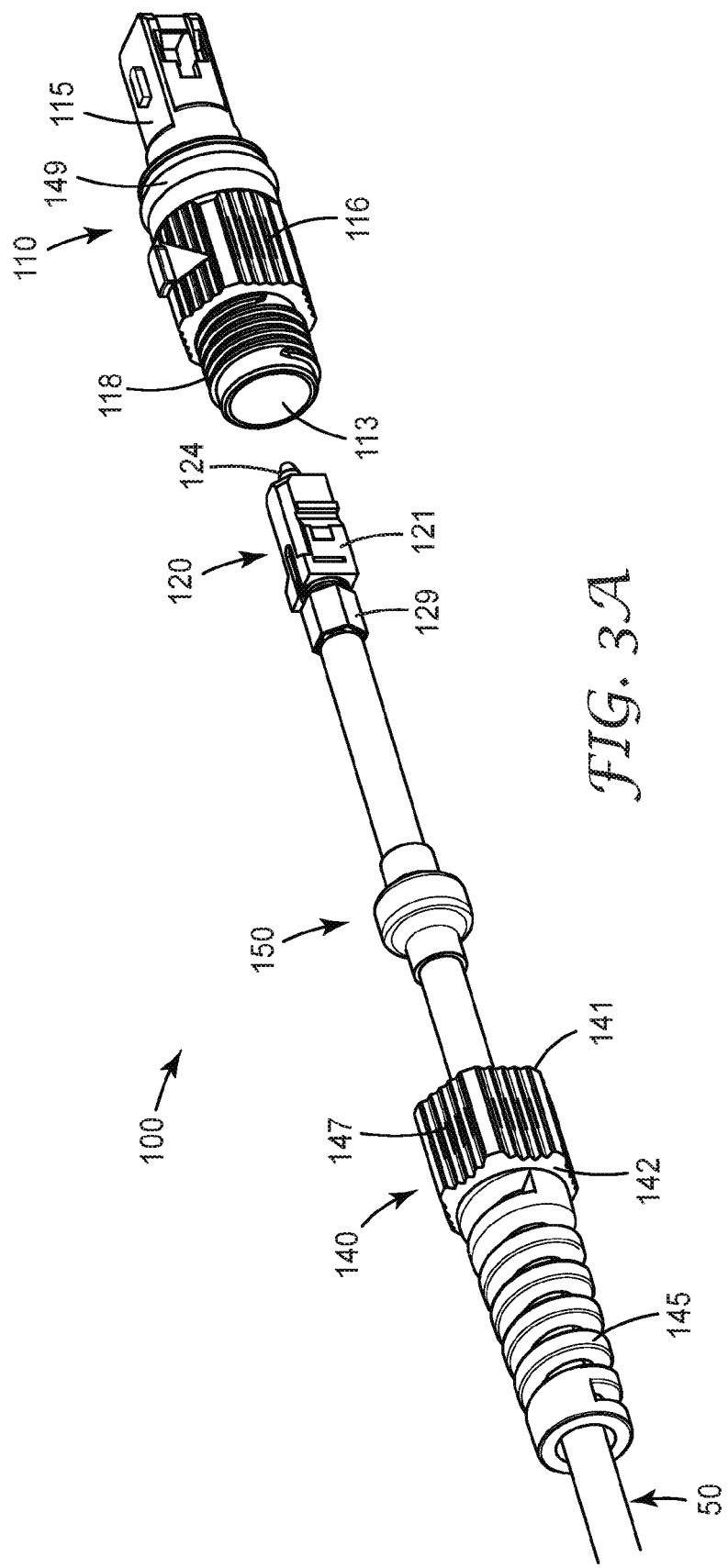
FIGS. 3A-3C are three views of a first exemplary ruggedized optical fiber connector utilizing the exemplary sealing device of FIGS. 1A-1C.
Figure 3B:
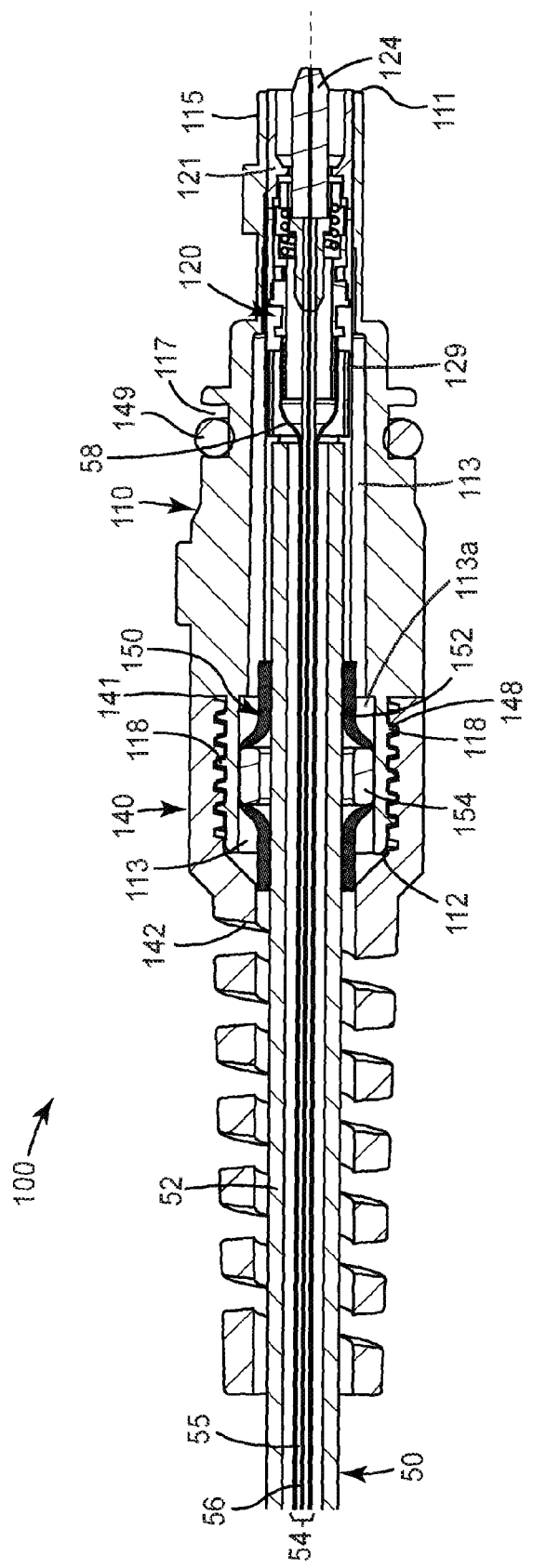
Figure 3C:
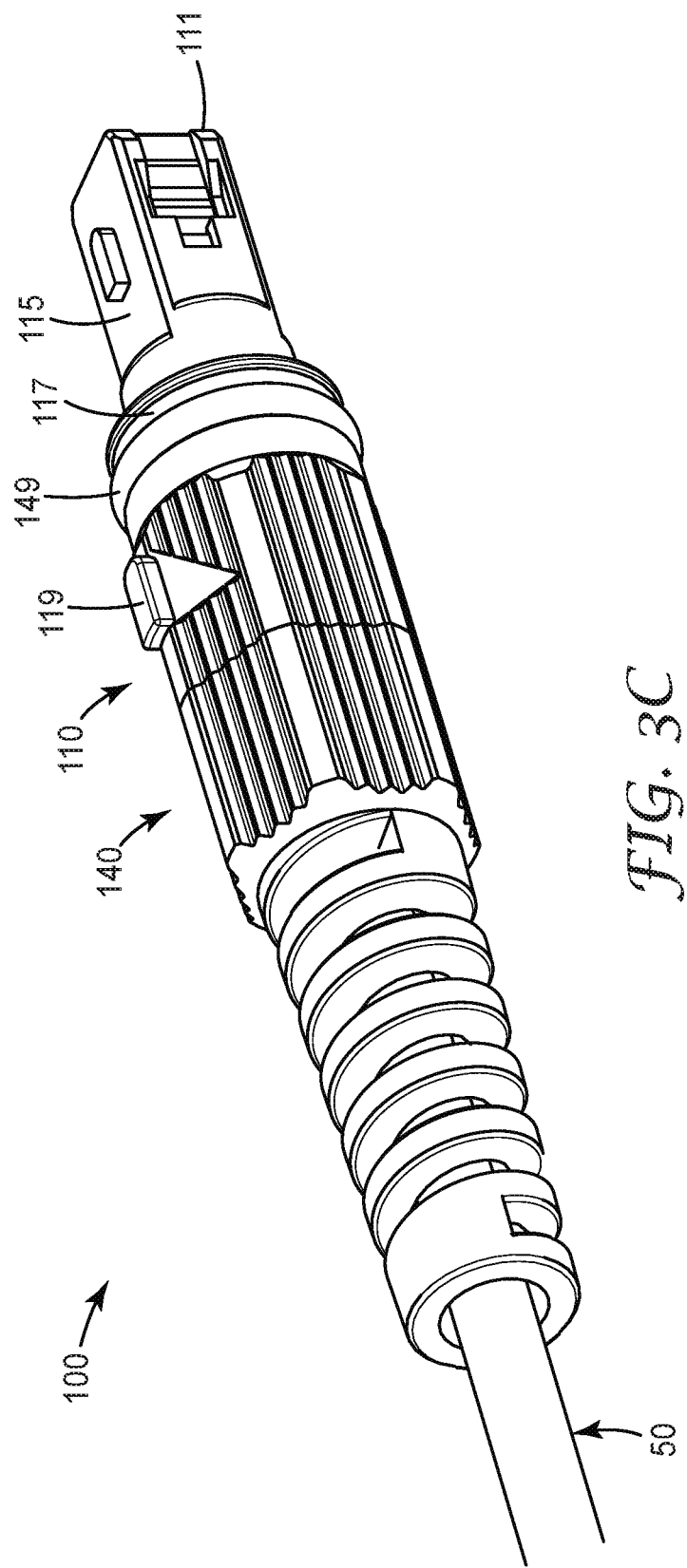

FIGS. 3A-3C show an exemplary ruggedized optical fiber connector 100 that includes a connector housing 110 having a first end 111 and a second end 112, a bend control member 140 attachable to the second end of the connector housing and an optical connection portion disposed within the connector housing at a first end of the connector. The connector housing, the bend control member and portions of the optical connection portion may be formed of plastic by conventional methods, for example by injection molding.

Figure 4B:
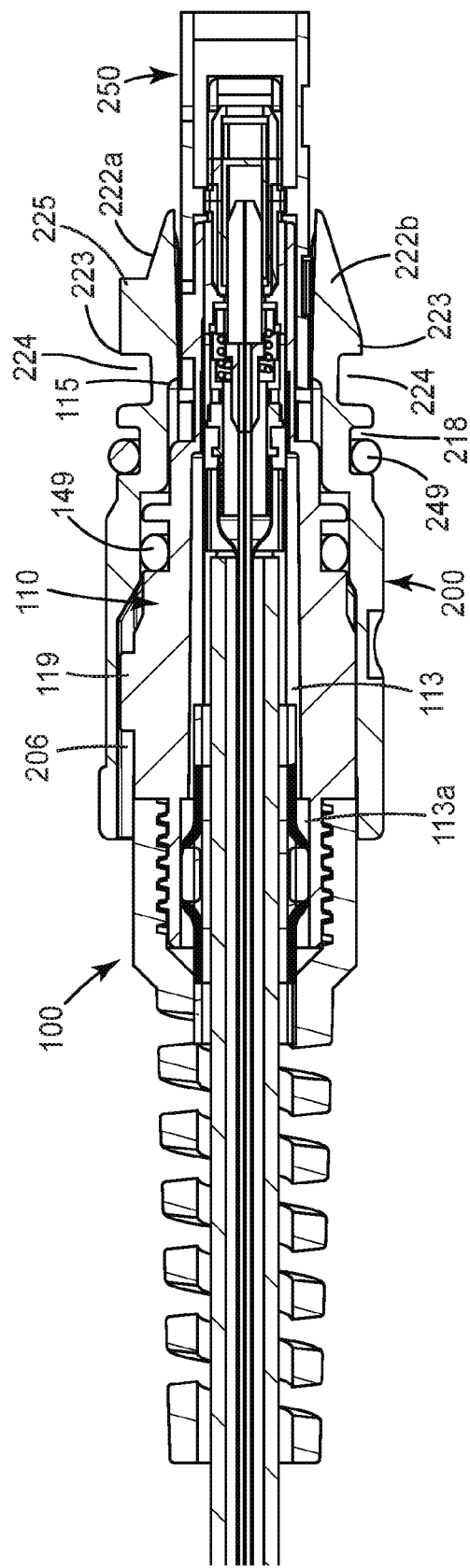
Figure 5A:
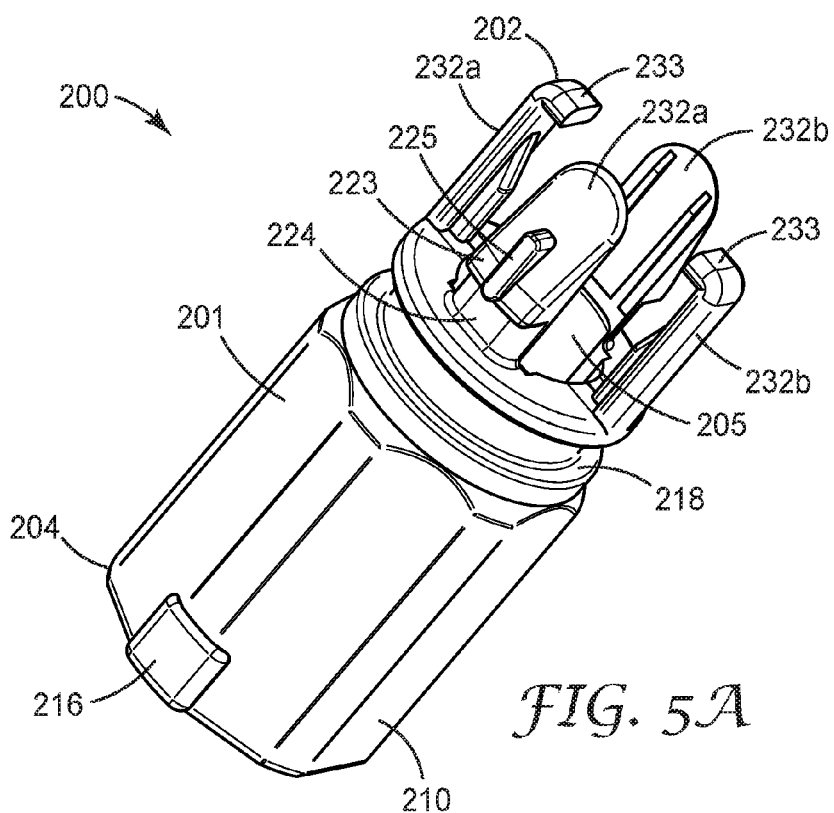
FIGS. 5A-5D are four views of a port adapter that can be used with exemplary ruggedized optical fiber connector of FIGS. 3A-3C.
Figure 5B:
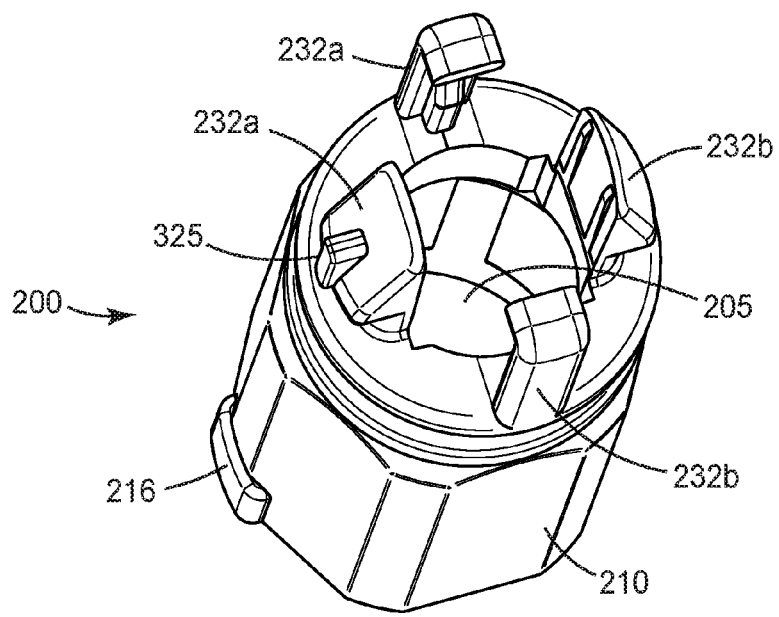
Figure 5C:
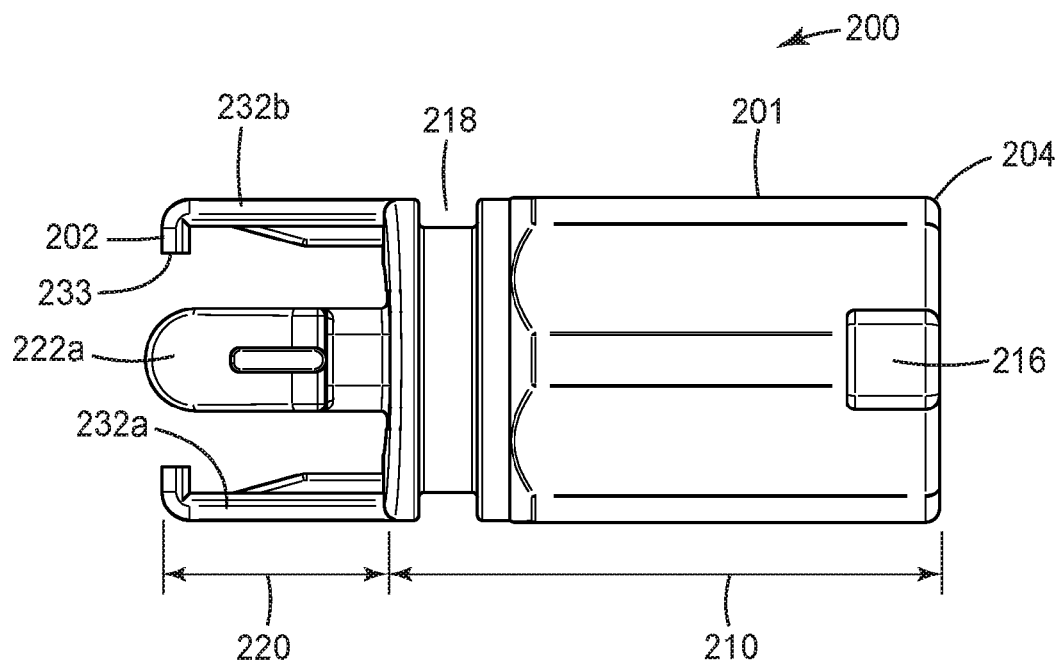
Figure 5D:
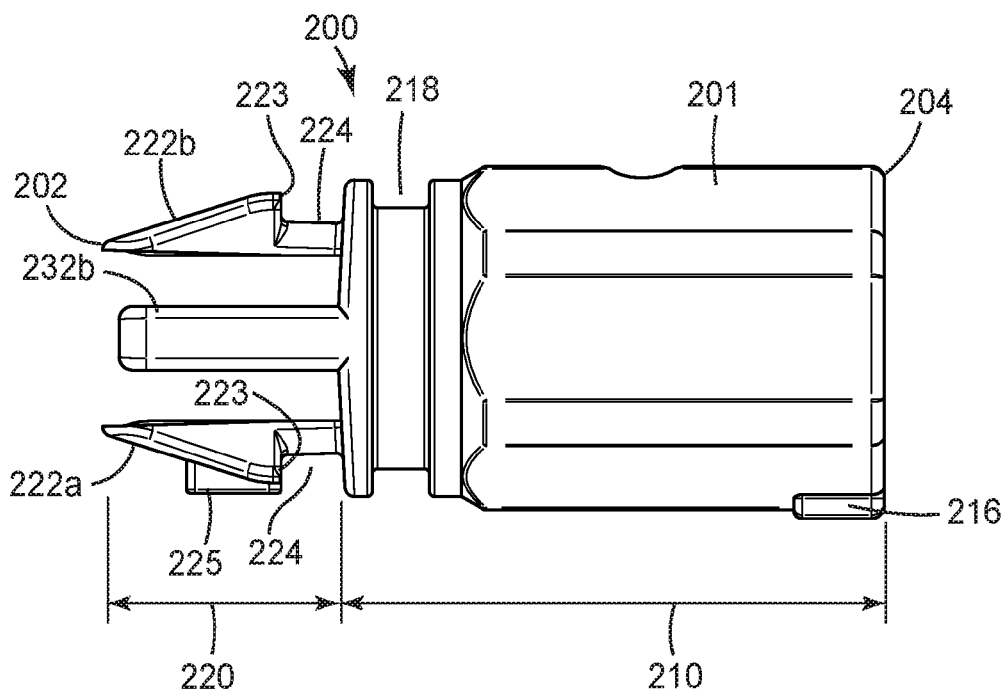

The connector housing 110 can be generally cylindrical in shape and includes a stepped interior cavity 113 that extends along the length of the connector housing from the first end 111 to the second end 112. A standard format shell portion 115 is integrally formed at the first end of the connector housing. The shell portion is configured to mate with a standard format optical coupling 250 (FIGS. 4A and 4B). Shell portion 115 is shown as an SC-format shell portion. However, as would be apparent to one of ordinary skill in the art given the present description, the shell portion (and the corresponding connection portion that is assembled into the shell portion) can have other standard formats, such as MT, MPO, ST, FC, MU and LC connector formats and can also be used with the exemplary connector structure described herein and are considered to be within the scope of the present disclosure.

In an exemplary embodiment, the connector housing 110 can have a gripping surface 116 on the external surface of the connector housing. The external gripping surface may have a hexagonally shaped cross-section to facilitate gripping of the cable securing device with a tool or by hand. The gripping surface region may have other geometric configurations such as a cylindrical shape, a rectangular shape or other polygonal shape. Additionally, the gripping surface may be textured (e.g. a ridged or cross-hatched texture) to further facilitate gripping of the cable securing device.

A groove 117 may be located between external gripping surface 116 and the first end 111 of connector housing 110 to receive an external sealing member 149 such as an O-ring. In an alternative aspect, the external sealing member and the connector housing of the optical connector can be formed using a 1K molding process. The external sealing member provides an environmental seal between the internal circumference of the port structure of a telecommunication enclosure and the ruggedized optical connector when connector 100 is installed directly within the port structure. In an alternative aspect, a port adapter 200 can be used to configure the size and shape of a port structure of a telecommunication enclosure to adapt the size and shape of the port structure so that it can accommodate ruggedized optical fiber connector 100 as shown in FIGS. 4A-4B. In this case, the external sealing member on the connector housing provides an environmental seal between the port adapter and the connector housing.

Figure 8A:
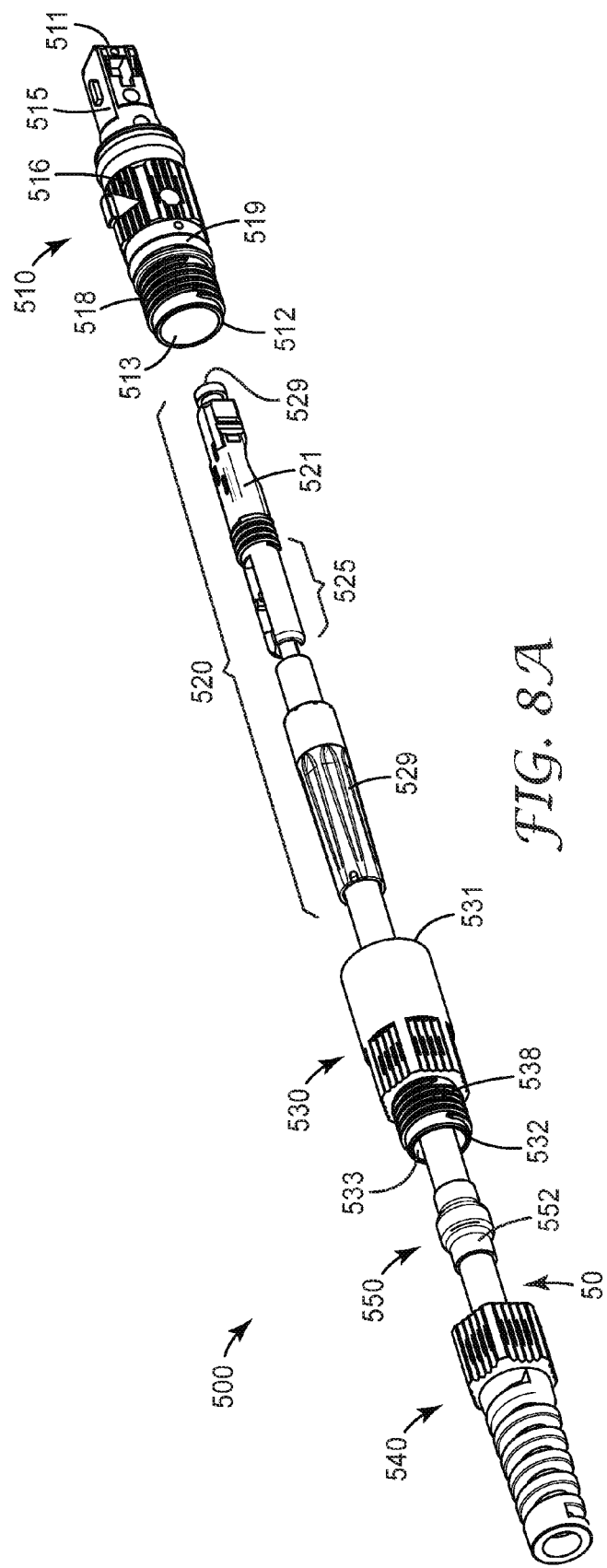
FIGS. 8A-8C are three views of a second exemplary ruggedized optical fiber connector utilizing the exemplary sealing device of FIGS. 1A-1C.
Figure 8B:
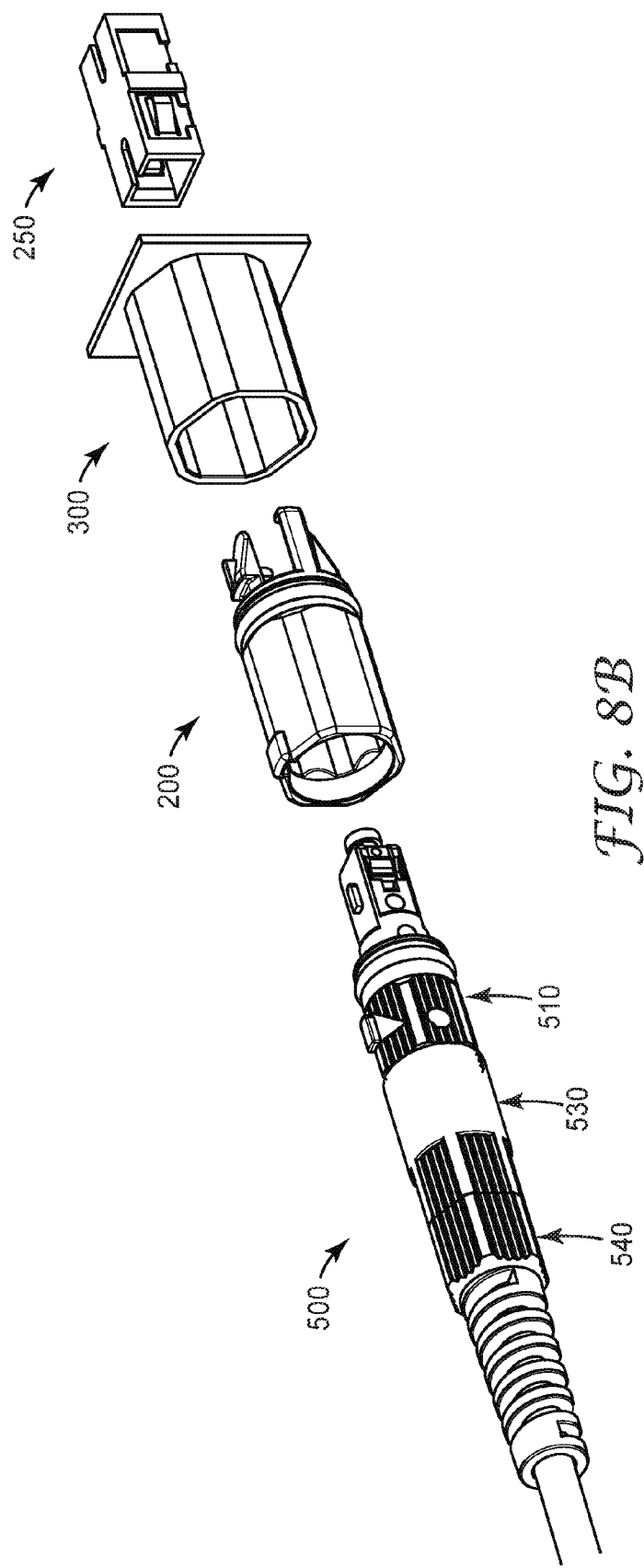
Figure 8C:
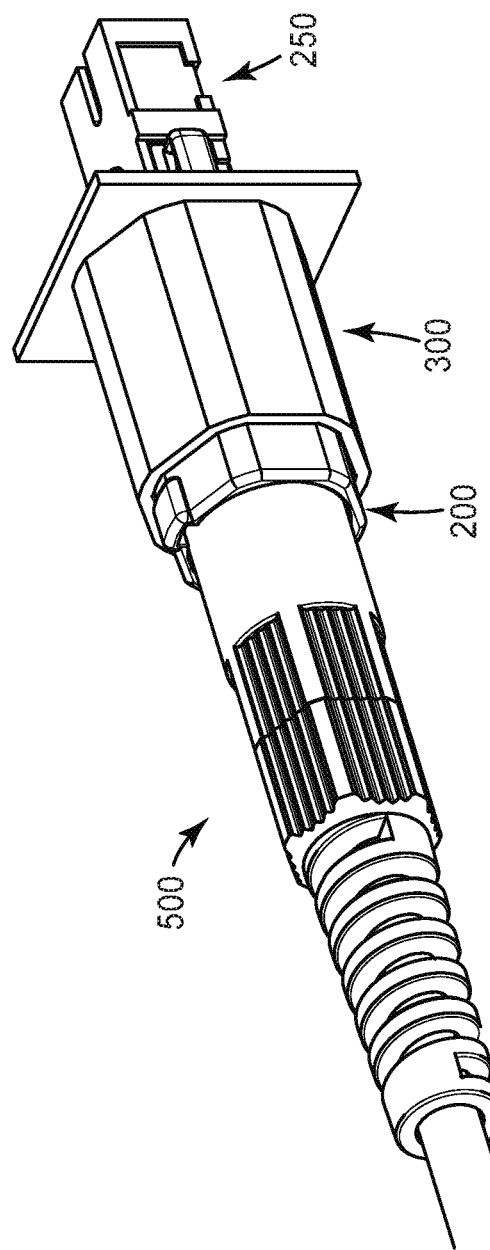

The exemplary cable sealing member 150 and the connection portion 120 are installed onto the terminal end of an optical fiber cable 50 prior to insertion into connector housing 110 through the second end 112 of the connector housing. In one exemplary aspect, the exemplary sealing member and the connection portion can be installed onto the cable and assembled into the connector housing in the factory (FIGS. 3A-3C) while in an alternative aspect, the exemplary sealing member and the connection portion can be installed onto the cable and assembled into the connector housing in the field (FIGS. 8A-8C). In an exemplary embodiment, the factory mounted connection portions can be the backbone and ferrule assembly from a standard epoxy connector such as the backbone and ferrule assembly found in a 3M™ 8800 Series No Polish SC Connector available from 3M Company (St. Paul, Minn.). In an alternative exemplary embodiment, the field mounted connection portions can be the backbone and ferrule assembly from a standard mechanical connector such as the backbone and ferrule assembly found in a 3M™ 8306 Epoxy Connector available from 3M Company (St. Paul, Minn.).

The connector housing 110 can have an external threaded portion 118 located between external gripping surface 116 and the second end 112 of the connector housing. The external threaded portion 118 cooperates with a corresponding internal threaded portion 148 of bend control member 140 so that the bend control member can be connected to the second end of the connector housing. In an alternative aspect, the bend control member can be attached to the second end of the connector housing by an interference fit or other mechanical attachment method.

Bend control member 140 has an opening extending between the first side 141 and a second side 142. The opening at the first side 141 is configured to accept the second end 112 of connector housing 110, while the opening at the second side can be smaller to accommodate the passage of a telecommunication cable therethrough.

In an exemplary embodiment, bend control member 140 can have a gripping surface 147 on its external surface that corresponds to the position of the internal threaded portion 148. The external gripping surface may be a hexagonally shaped cross-section to facilitate gripping of the cable securing device with a tool or by hand. The gripping surface region may have other geometric configurations such as a circular cross-section, a rectangular cross-section or other polygonal cross-section. Additionally, the gripping surface may be textured (e.g. a ridged or cross-hatched texture) to further facilitate gripping of the cable securing device.

In addition, bend control member 140 includes an integral bend control boot 145. The bend control boot prevents the telecommunication cable from exceeding its minimum bend radius which could result in degradation of the signal being carried on the telecommunication cable. In an alternative aspect, a bend control member that does not include a bend control boot can be used with low bend radius cables or bend resistant cables.

Exemplary ruggedized optical fiber connector 100 is assembled by first sliding bend control member 140 and the rigid washer onto the cable.

The terminal end of the optical fiber cable is stripped and cleaved to reveal the bare glass portion 56 of optical fiber 54. This prepared end of the optical fiber cable can be inserted into the fiber optic backbone 121 of optical connection portion 120 until the terminal end of the bare glass portion extend beyond the end face of ferrule 124. The optical fiber can be adhesively or mechanically secured in fiber optic connector backbone 121. The excess length of fiber protruding from the end face of the ferrule is removed. The end face of the fiber can be finished using a standard factory polish technique (e.g., a flat or angle-polish, with or without bevels).

A mini-boot 129 is attached to the back end of the fiber optic connector backbone 121 to facilitate handling of the optical connection portion 120 through the remainder of the optical connector assembly process and can optionally secure strength members 58 (shown in FIG. 3B) or the cable jacket (not shown) to the backbone of the connection portion.

Next, the cable sealing device is positioned behind the mini-boot as described previously, except that the elastic sleeve is expanded sufficiently to allow the optical connection portion and the rigid washer to pass at least partially through the expanded elastic sleeve. The rigid washer should be placed at the mid-plane of the elastic sleeve approximately about 20 mm to about 40 mm from the end of the backbone. The tool is released allowing the elastic sleeve to recover so that it is disposed over the cable and the rigid washer as described previously.

Next, the cable having the optical connection portion 120 and the exemplary cable sealing device is slid into the cavity of connector housing 110 until is secured shell portion 115 on the first end of the connector housing and the cable sealing device is snugly disposed in recess portion 113a (FIGS. 3B and 4B) of cavity 113. In an exemplary aspect, a lubricant can be applied to the elastic sleeve over the rigid washer to facilitate installing the cable sealing device in the tight fitting recessed portion of the cavity.

Bend control member 140 is secured to the connector housing by engaging internally threaded portion 148 of the bend control member with the corresponding external thread portion 118 on the second end 112 of the connector housing 110 to yield the fully assembled optical connector 100.

Ruggedized optical fiber connectors described herein are typically used in applications where optical connections are made outside of an environmentally protected space such as a sealed enclosure, a cabinet or a building in FTTx optical fiber networks. In many applications, ruggedized optical fiber connectors are used at the interface between the protected space within a protective enclosure and the unprotected external environment and as such must ensure that the protected space is maintained when the ruggedized optical fiber connectors are used to make optical connections, which is why the ruggedized optical fiber connector provide an environmental seal between the connector body and a port structure into which said connector is inserted and between the connector housing and the cable being terminated by said connector.

In one exemplary aspect, the exemplary optical fiber connector can be used to connect an end user to a remote fiber terminal in a fiber to the premise network. In another aspect of the invention, the exemplary fiber optic connector can be used to connect an antenna on a cellular tower to equipment in a base station located at the foot of the tower.

The exemplary optical fiber connector may be fitted to the terminal end of a communication cable and inserted into a port in a telecommunication enclosure to provide an optical connection interface within the communication enclosure. Depending on the communication network architecture, the telecommunication enclosure may be a buried closure, an aerial closure or terminal, a fiber distribution hub or an optical network terminal in the outside plant or a wall mount communication box, fiber distribution hub, a wall mount patch panel, or an optical network terminal in premise applications. The exemplary fiber optic connector provide an enhanced environmental seal when installed in the port of a telecommunications enclosure.

In one aspect of the present invention, the exemplary ruggedized optical fiber connectors described herein can be plugged directly into the port structure of a protective enclosure and into and optical coupling disposed at least partially within the protected space of the protective enclosure.

However, port structures of protective enclosures can vary in size and shape by the type/style of protective enclosure as well as from manufacturer to manufacturer. Thus, a port adapter may be needed to facilitate the use of the exemplary ruggedized optical fiber connectors described herein across a wide range of protective enclosures. Port adapters can be used to adjust the size and shape of the port structure to that required to accommodate a ruggedized optical fiber connector.

Figure 6A:
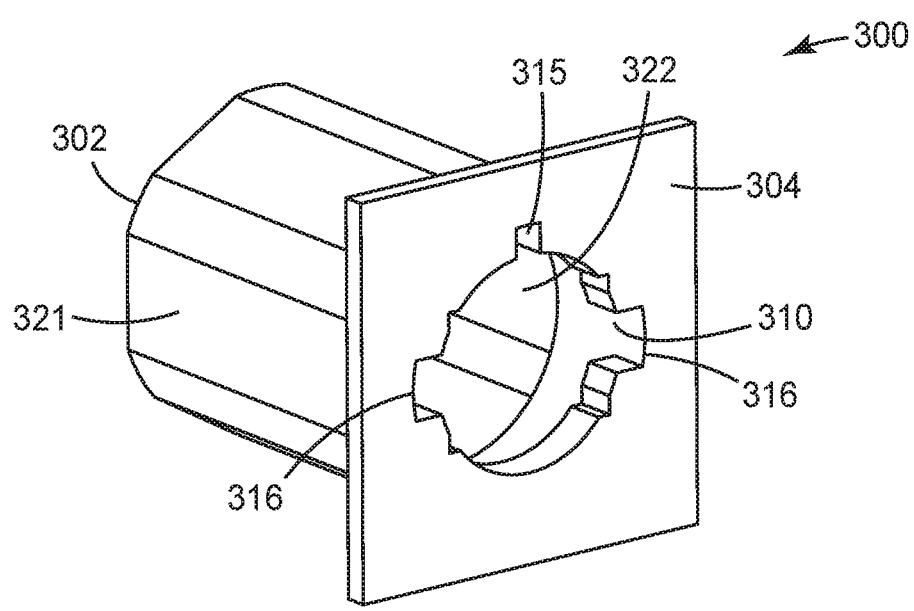
FIG. 6A is a schematic view of the port structure that is configured to accept the port adapter assembly of FIGS. 5A-5D.

FIG. 6A is a schematic representation of one style of port structure 300. Port structure 300 extends from a wall portion 304 that can be part of a telecommunication enclosure or a bulkhead. In an exemplary aspect, the port structure includes not only an opening or port 310 through the wall portion but also some additional structural elements associated with the opening or port. Port structure includes a tubular sleeve section 321 extending from one surface of the wall portion round the port opening. In the case of a telecommunication enclosure, the sleeve section can extend from an exterior surface of the wall portion, the interior surface of the wall portion inside the enclosed space of the enclosure body, or can extend from both the interior and the exterior surface of the wall portion to that a portion of the sleeve section is disposed inside the enclosure an a portion of the sleeve section extends outside of the enclosure. For a bulkhead, the sleeve portion can extend from either side of the wall portion or can extend from both sides of the wall portion. In an exemplary aspect, the sleeve section is integrally formed with the wall portion. Alternatively, the sleeve section can be formed separately and attached to the wall section by mechanical means such as mechanical fasteners or integrally formed latch arms, for example or the sleeve section can be bonded to the wall portion by an adhesive or by a welding technique.

Figure 6B:
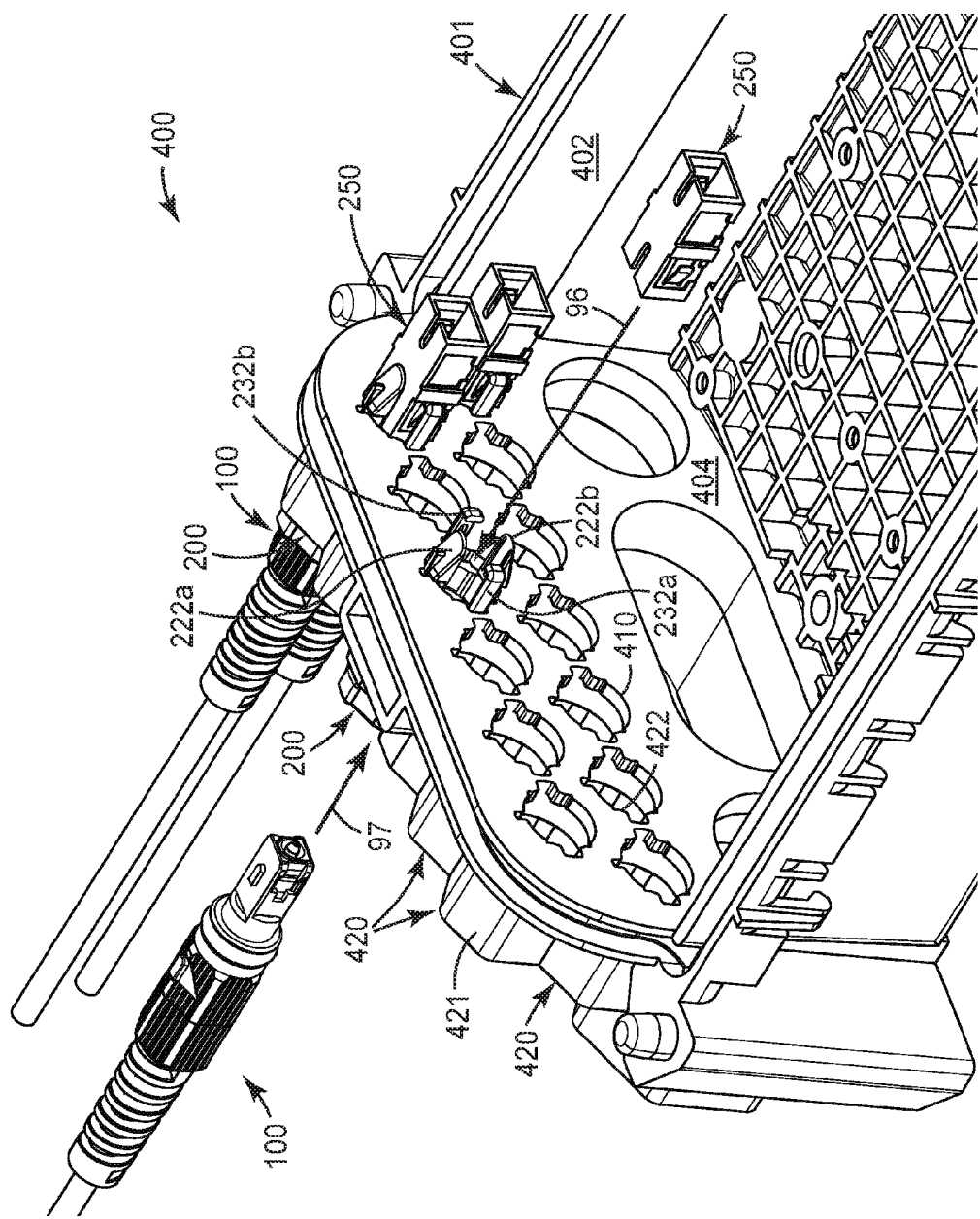
FIG. 6B is a partially exploded isometric view of a telecommunication enclosure having a plurality of ruggedized optical fiber connectors disposed in the port structures of said enclosure.

The port structures can be singular structures that can be arranged in one and two dimensional spaced apart arrays (i.e. each sleeve section is distinct). In another aspect, the sleeve sections can be conjoined enabling a higher density of ports in the enclosure or bulkhead. For example, FIG. 6B shows a portion of a telecommunication enclosure having a two dimensional array of conjoined port structures.

Sleeve section 321 has a first end at the wall portion of the port structure 300 and a second end 302 disposed at the end opposite the first end. The sleeve section is tubular having a channel 322 extending from the second end to the first end and through the wall portion 304. The point at which the channel passes through the wall portion is defined as the port opening 310. The sleeve section of the port structure can have an external shape of a hexagonal prism, although have other geometric configurations such as a cylinder, a rectangular prism or other polygonal prism.

In an exemplary aspect, port opening 310 can be generally circular in shape or can have other shapes as required by the chosen application. In FIG. 6A, port opening 321, corners have been squared off allowing the port opening to help ensure alignment between a sealed connector inserted into the port structure and an optical coupling located adjacent to the port opening. Additionally, the port opening includes one or more alignment notched<notch?>. Alignment notch 315 can be used in conjunction with a keying protrusion 225 of port adapter 200 to ensure that the port adapter is inserted into the port structure in a known orientation. Notches 316 formed on either side of notch 315 and on opposite side of the port opening are configured to accept coupling latch arms 232a, 232b (refer to FIGS. 5A-5d to see the features of the port adapter). These latch arms can aid in initial alignment of the port adapter as it passes through the port opening.

An exemplary port adapter 200 is shown in FIGS. 4A-4B and FIGS. 5A-5D. Port adapter 200 has an adapter body 201 having a first end 202 and a second end 204 and a passageway 205 extending through the adapter body from the first end to the second end. Adapter body 201 includes a cuff portion 210 at the second end of the adapter body and securing portion 220 extending from the cuff portion to the first end of the adapter body. The securing portion can be configured to secure the port adapter into the port structure of a protective enclosure and/or to secure an optical coupling into which the ruggedized optical fiber connector and another standard optical fiber connector inserted to complete an optical connection at least partially within the protective enclosure.

The securing portion 220 includes a pair of port latches 222a, 222b (or collectively 222) configured to secure port adapter 200 into port of a protective enclosure or at a bulkhead and a pair of coupling latch arms 232a, 232b (or collectively 232) that engage with a standard optical coupling, such as an SC format optical coupling 250 as shown in FIGS. 4A, 5A-5D, 6B and 7D.

Port latches 222 can be in the form of spring arms that have a notch 224 between the cuff portion 210 of the port adapter 200 and a hook portion 223 of the port latches that engages with a wall 304 of the port structure 300 (FIG. 6A) in which it is installed. The port latches can be flexed in toward the centerline of the port adapter when the port adapter is inserted into the port structure. Once the first end of the port adapter has passed a sufficient distance through the port structure, the port latches will spring out so that a hooked portion 223 on an outer surface of the latch arm engages with the port structure to secure the port adapter therein. In an exemplary aspect, the port adapter can have a keying protrusion 225 formed on at least one of the exterior port latches to serve as a key when the port adapter is inserted into the port structure in a known orientation.

Coupling latch arms 232a, 232b are configured to engage and hold a standard format optical coupling at least partially in the securing portion 220 of port adapter 200. Each coupling latch arm can include a latching extension 233 that extends generally perpendicularly from the terminal end of each coupling latch arm over passageway 205. The latching extensions snap over the flange 258 between the first and second connector receiving portions 252, 254 of the coupling to secure the optical coupling in the port adapter. In an exemplary aspect, each coupling latch arm can also include a centering ridge formed on its inside surface to ensure that the opening of the first connector receiving portion is aligned with the passageway 205 through the cuff portion 210 of the port adapter enabling easier insertion of the ruggedized optical connector into the optical coupling.

Installation of the optical coupling 250 into the securing portion 220 of the port adapter serves as a secondary locking mechanism for the port latches 222. When the coupling is disposed in the securing section, the port latches cannot flex in toward the centerline of the port adapter preventing the removal of the port adapter from the port structure.

The cuff portion 210 of port adapter 200 has a generally tubular structure such that the external shape of the cuff portion is configured to closely fit with the internal geometry of the port structure into which it will be inserted. In the exemplary aspect shown in the figures, cuff portion 210 has a generally hexagonal cross-section that is configured to fit into a hexagonal port structure such as is found in BPEO closures which are available from 3M Company (St. Paul, Minn.). In other aspects, the external shape of the cuff portion can be rectangular, cylindrical or another shape which is commonly used in protective telecommunication enclosures. The cuff portion can include a groove 218 disposed in its exterior surface to hold an adapter sealing member 249 such as an elastomeric or rubber O-ring. Adapter sealing member 249 ensures an environmental seal between the port adapter and the port structure of the protective enclosure.

Figure 7A:
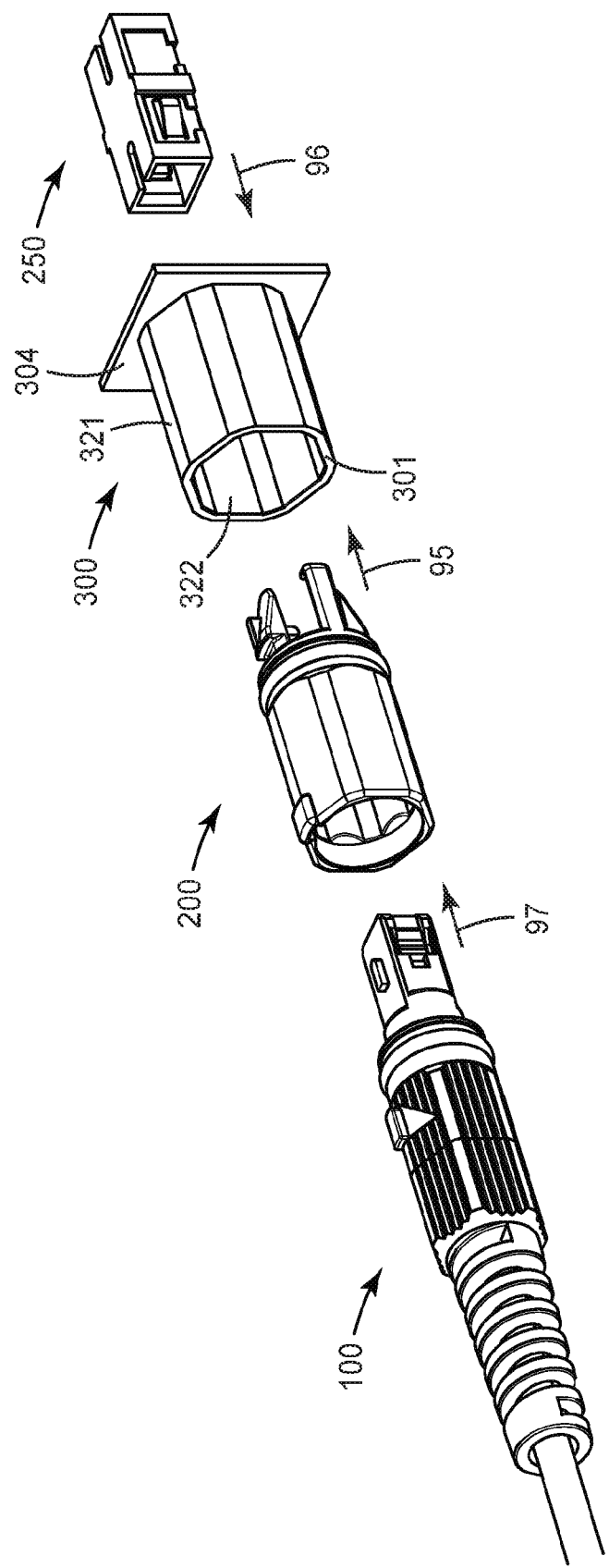

In some aspects, port adapter 200 can include a stop 216 formed on the exterior of the cuff portion 210 adjacent to the second end 204 of the port adapter to ensure the proper axial positioning of the port adapter in the port structure 300 in which it is installed. In the exemplary embodiment shown in FIGS. 7A-7B, the stop is raise feature that prevents the port adapter from being inserted too far into the port structure.

The passageway 205 through the port adapter 200 is configured to receive a ruggedized optical connector such as ruggedized optical fiber connector 100. In an exemplary aspect, the passageway through the adapter is designed to be close fitting with the connector housing 110 of the ruggedized optical fiber connector so that the exterior sealing member 149 of the ruggedized optical fiber connector provides an environmental seal between the port adapter and the connector housing.

In an exemplary aspect, the port adapter can include a slot 206 within a side wall of the passageway through the port adapter that is configured to accept a keying protrusion 119 formed on the exterior surface of the connector housing 110 of the ruggedized optical fiber connector 100 as shown in FIG. 4B. These mating keying structures ensure that the connector is inserted in the port adapter in a known orientation and as a result the shell portion 115 of the connector housing is disposed in the correct orientation for insertion into optical coupling 250 (see FIGS. 4A and 7B).

FIG. 6B shows a portion of protective telecommunication enclosure 400 having a plurality of ruggedized optical fiber connectors 100 optically connected to connectorized pigtails (not shown) disposed within the enclosure body 401 and FIG. 6A is a schematic detail view of one of the port structures 300 of a telecommunication enclosure or bulkhead.

Telecommunications enclosure 400 includes a base 401 and a cover (not shown) that is removably securable to the base. The base 401 includes at least one port or port structure 420 for receiving ruggedized optical fiber connector. The base may have one, two, or any other number port structures 420 as needed for a particular application. In the embodiment shown in FIG. 6B, the port structures 420 are disposed in a hexagonal close packed arrangement allowing for a higher density of ports in a smaller amount of space, thus increasing the capacity of enclosure 400. The cover may be secured to the base 401 by a bail, clamps or other mechanical fastening method. When engaged, the base and cover provide protected space within the enclosure for the internal components such as splice trays, splitters/splitter modules, fan-out devices, etc. from the weather, insects and other external hazards.

The portion of the telecommunication enclosure 400 shown in the figures includes a first wall section 402 and a second wall section 404 extending approximately perpendicularly from the first wall section. The second wall section is shown having a plurality of port structures 420 for receiving a fiber optic connector of the present invention. In a first aspect, the port structure has an integral sleeve section 421 disposed around the port opening 422 outside of the enclosure 400. The exemplary sleeve section of port structure can be generally cylindrical port structure extending from an end wall of the enclosure. Alternatively, the sleeve portion can have to form of a hexagonal tube, a rectangular tube or other polygonal tubular shape. In an alternative aspect, the sleeve portion can extend into the body of the enclosure, while in yet another aspect a portion of the sleeve portion around the port can extend from an exterior wall of the enclosure and a portion can extend from an interior wall of the enclosure into the body of the enclosure.

When the external shape of optical connector 100 corresponds to the internal configuration of the sleeve portion of the port structure in size and shape, the connector can be directly inserted into the port structure. A standard telecommunication optical adapter can be attached to the top of the interior portion of the port structure by a mechanical fastener such as a screw or rivet that pass through fastening holes located in the central flange of the optical coupling, by an adhesive or via an interference fit wherein the top lip of the port structure has a pair of posts to engage with the fastening holes of the standard telecommunication optical coupling.

Figure 7B:
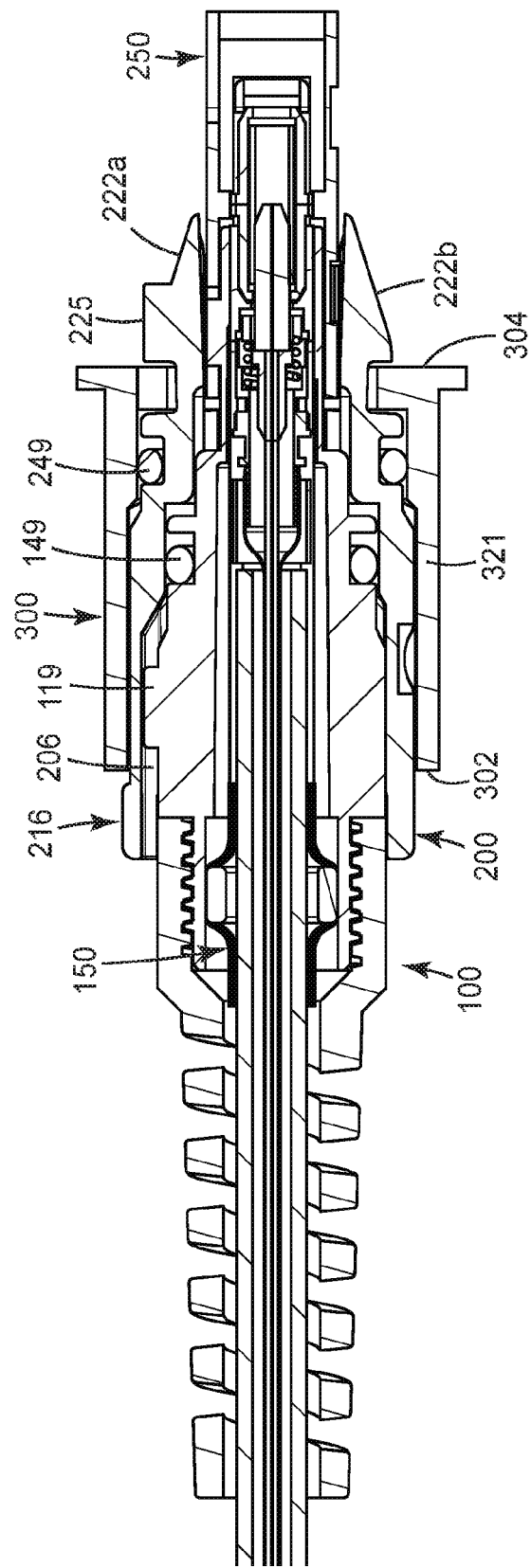
Figure 7D:
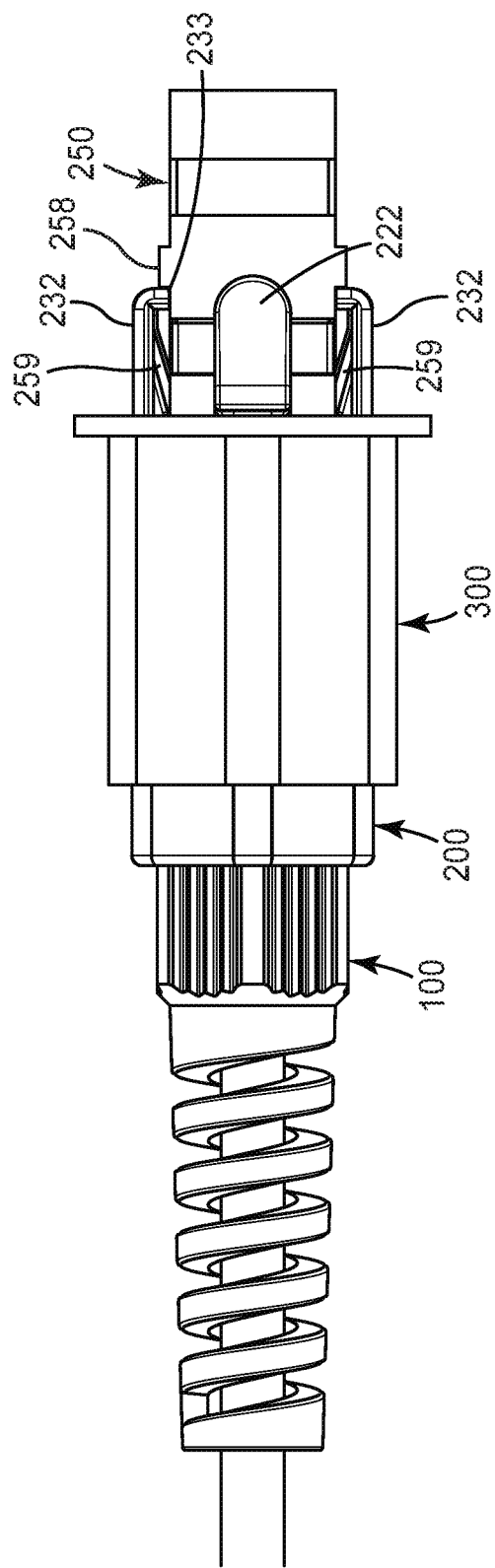

If the interior configuration does not directly correspond to the outer shape of the optical fiber connector 100, a port adapter 200 can be used with the optical fiber connector to provide a sealed connection between the port and the connector. In this case, the external sealing member 149 of the optical connector provides an environmental seal between the internal circumference of the port adapter and the optical connector and adapter sealing member 249 ensures an environmental seal between the port adapter and the port structure as shown in FIG. 7B. Cable sealing device 150 within the connector housing of the connector provides a seal between the connector housing of the connector and the optical fiber cable passing therethrough.

FIG. 6B shows a partially populated enclosure base. Two of the ports have an optical fiber coupling 250 attached to a first end of a port adapter 200 with a sealed optical fiber connector positioned in the port adapter. A third port has a port adapter disposed therein with the port latches engaged with a portion of the second wall 404 adjacent to the port. An optical fiber coupling 250 can be inserted into the first end of the port adapter, as indicated by directional arrow 96, until the pair of coupling latch arms 232a, 232b (or collectively 232) that engage with a standard optical coupling locking it in the port adapter. Next, optical fiber connector 100 is inserted into the port adapter as indicated by directional arrow 97. An optical fiber pigtail (not shown) can be plugged into the second side of the optical fiber coupling inside the enclosure.

A field mountable optical fiber connector 500 of the current invention is shown in FIGS. 8A-8C. Optical fiber connector 500 includes a connector housing 510 having a first end 511 and a second end 512, a housing extension 530, a bend control member 520 attachable to the second end of the connector housing and a field mountable optical connection portion disposed within the connector housing at a first end of the connector. The connector housing, the bend control member, the housing extension, and portions of the optical connection portion may be formed of plastic by conventional methods, for example by injection molding.

Field mountable optical connection portion 520 can be secured within the shell portion 515 of connector housing 510 via a snap fit. Utilizing a field mountable optical connection portion 520 allows preparation of drop cable in the field for either connection repair or to make custom length drop cables rather than having to stock a large number of factory prefabricated drop cables having a prescribed lengths. This can save the service provider money in at least two ways. In repair situations, the craftsman can cut of a faulty connector or damage portion of a drop cable and install the exemplary field mountable ruggedized connector described herein rather than having to totally replace the damaged drop cable. Alternatively, the craftsman can carry a spool of optical fiber drop cable and prepare the drop cable on site reducing the cost associated with excess length of prescribe length factory prepared drop cables.

Field mountable optical connection portion 520 can have an analogous structure to the backbone of the field mountable fiber optic connector as described in commonly owned U.S. Patent Publication No. 2011/0044588, incorporated herein by reference in its entirety with the exception that the outer shell of the optical fiber connector is not needed since the structure of said outer shell is integrally formed with connector housing 510 of the exemplary ruggedized optical fiber connector 500.

Field mountable optical connection portion 520 includes a backbone 521 having a first end and a second end wherein the backbone is configured to retain a collar body having a ferrule and a boot 529 that is attachable to the second end of the backbone.

The collar body includes a fiber stub secured in ferrule (which is covered by dust cap 529 in FIG. 8A) by an epoxy or other suitable adhesive, and a mechanical splice device. The ferrule can be formed from a ceramic, glass, plastic, or metal material to support the optical fiber stub inserted and secured therein. In a preferred aspect, ferrule is a ceramic ferrule. The optical fiber stub is inserted through ferrule, such that a first fiber stub end slightly protrudes from or is coincident or coplanar with the end face of the ferrule. Preferably, this first fiber stub end is factory polished (e.g., a flat or angle-polish, with or without bevels). A second end of the fiber stub extends part-way into the interior of the Field mountable optical connection portion and is spliced to the terminal end of an optical fiber cable (such as optical fiber cable 50). Preferably, the second end of the fiber stub can be cleaved (flat or angled, with or without bevels). The fibers stub can comprise standard single mode or multimode optical fiber, such as SMF 58 (available from Corning Inc.). Ferrule can be secured to the collar body via an epoxy or other suitable adhesive.

The splice device is held within a splice element housing portion of the collar body. In an exemplary embodiment, splice device can be a mechanical splice device (also referred to as a splice), such as a 3M™ FIBRLOK™ mechanical fiber optic splice device, available from 3M Company, of Saint Paul, Minn.

The backbone can include a clamping portion 525 that is figured to clamp onto one of the polymeric coatings (i.e. a buffer coating layer or the cable jacket) that surrounds a portion of the terminated optical fiber upon actuation. Boot 529 can be used to actuate the clamping portion of the backbone when it is attached to the backbone. The optical fiber connector can be terminated in the field without the need to use a separate termination platform or tool.

The connector housing 510 is analogous to connector housing 110 shown in FIGS. 3A and 3B. Connector housing 510 can be generally cylindrical in shape and includes a stepped interior cavity 513 that extends along the length of the connector housing from the first end 511 to the second end 512. A standard format shell portion 515 is integrally formed at the first end of the connector housing. The shell portion is configured to mate with a standard format optical coupling 250 (FIGS. 4A and 4B). Shell portion 515 is shown as an SC-format shell portion. However, as would be apparent to one of ordinary skill in the art given the present description, the shell portion (and the corresponding connection portion that is assembled into the shell portion) can have other standard formats, such as MT, MPO, ST, FC, MU, and LC connector formats and can also be used with the exemplary connector structure described herein and are considered to be within the scope of the present disclosure.

Field mountable optical connection portion can come in a variety of styles and lengths. If field mountable optical connection portion 520 is too long (i.e. if the length of the connection portion plus the length of the cable sealing member is greater than the length of the cavity within the connector housing) a housing extension 530 can be added to field mountable connector 500 as shown in FIGS. 8A-8C. Housing extension 530 is configured to attach to the second end 512 of the connector housing 510 between the connector housing and bend control member 540. The housing extension can be generally cylindrical in shape and includes a stepped interior cavity 533 extending along the length of the connector housing from the first end 531 to the second end 532. The housing extension has interior threads (not shown) disposed within the interior cavity through the housing extension and adjacent to first end 531 to connect the housing extension to the external threads 518 on the connector housing. In addition, the housing extension has external threads adjacent to the second end of the housing extension to enable connection the bend control member 540 to the second end of the housing extension.

An inter-housing sealing member 519 can be disposed between external gripping surface 516 and external threaded portion 518 of connector housing. The inter-housing sealing member provides an environmental seal between the connector housing 510 and housing extension 530 when the housing extension is attached to the second end of the connector housing.

Exemplary cable sealing member 550 is analogous to cable sealing member 150 shown in FIG. 1A and comprises a spreading member (not shown) that fits loosely over the outer circumference of the cable 50 being terminated and an expandable elastic sleeve 552 which is positioned over the spreading member. Cable sealing member 550 is configured to fit into the interior cavity adjacent to the second end of the housing extension of field mount connector or can fit into the interior cavity of the connector housing if the field mount connection portion is sufficiently short. The combined outer circumference of the spreading member disposed under elastic sleeve 552 of exemplary cable sealing device 550 should be slightly larger than cross-sectional shape of the interior cavity 533 of the housing extension into which it will be inserted so that the sealing device fits snugly within the cavity. In other words, the spreading member will be held in a fixed position relative to the housing extension when an external force is applied to the cable.

Exemplary optical fiber connector 500 is assembled by first sliding bend control member 540 and the rigid washer of cable sealing member 550 over the fiber cable 50 for later use. Elastic sleeve is fitted on to an expansion tool (not shown). The expansion tool is engaged to stretch the elastic sleeve so that it is opened to a diameter greater than the diameter of the washer. The expanded elastic sleeve is threaded onto the cable until it is positioned roughly over the rigid washer and the housing extension member and boot 529 are fitted onto the cable.

Optical connection portion 520 can be mounted onto the terminal end of optical fiber cable 50 by a method that is analogous to the assembly method of the field mountable connector described in U.S. Patent Publication No. 2011/0044588 with the exception that shell portion is not attached to the backbone at this point in time.

Optical connection portion 520 can be partially pre-assembled such that the collar body with the ferrule secured therein is held within backbone 521. This step may be performed prior to the field termination process or during the field termination process.

For field termination, optical fiber cable 50 is prepared by cutting of a portion of the fiber cable jacket 52 and stripping off a coated portion of the optical fiber 54 near the terminating fiber end to leave a bare glass fiber portion and cleaving (flat or angled) the fiber end to match the orientation of the pre-installed fiber stub. In an exemplary aspect, about 70 mm of the jacket 52 can be removed, leaving about 8 mm of stripped fiber. For example, a commercial fiber cleaver such as an Ilsintech MAX CI-01 or the Ilsintech MAX CI-08, available from Ilsintech, Korea (not shown) can be utilized to provide a flat or an angled cleave. No polishing of the fiber end is required, as a cleaved fiber can be optically coupled to the fiber stub in the splice device. The prepared end of optical fiber cable 50 is inserted through the rear end of the backbone 521 of the partially pre-assembled optical connection portion. In this manner, the prepared fiber end can be spliced to the fiber stub with the mechanical splice device housed in the collar body within backbone 521. The fiber cable 50 is continually inserted until the coated portion of the fiber begins to bow (which occurs as the end of fiber meets the fiber stub within the collar body with sufficient end loading force). The splice device is actuated while the fibers are subjected to an appropriate end loading force. The fiber jacket can then be released, thereby removing the fiber bow.

Boot 529 (which is previously placed over fiber cable 50) is then pushed axially toward the backbone 521 and screwed onto the backbone mounting section to secure the boot in place to complete the mounting of exemplary optical connection portion 520 onto optical fiber cable 50. Housing extension member 530 is slid forward over the connection portion and secured to the connector housing 510. The cable is pulled back until the end of boot 529 is near opening 533 at the second end of the housing extension. Next, cable sealing member 550 is positioned behind the boot such that there is a small gap from about 0 mm to about 5 mm between the boot and the cable sealing member. The cable sealing member allows the cable to move with respect to connector housing while the position of the sealing member remains fixed with respect to the housing.

Next, optical connection portion 520 is slid forward in cavity 513 of connector housing 510. Sealing member is positioned within the second end of the housing extension member 530, and the optical connection portion is snapped into shell portion 515. After ensuring that sealing device 550 is properly seated in the second end of the cavity of housing extension member, bend control member 540 is secured to the second end of housing extension member by engaging internally threaded portion of the bend control member with the corresponding external thread portion 538 on the second end 532 of the housing extension member to yield the fully assembled optical connector 500 as shown in FIG. 8B.

In another aspect, the components for a field mount connector of the present invention can be packaged as a kit of parts that the craftsman can use in the field to make a sealed/ruggedized connection in the field. For example, the kit of parts for a field mounted sealed optical fiber connector can include a connector housing having an interior cavity extending from a first end to a second end of the connector housing and a shell portion integrally formed at the first end of the connector housing, a field mountable optical connection portion that can be secured in the shell portion of the connector housing, a spread member, arrangeable around the cable such as to be axially movable relative to the cable; and an expandable elastic sleeve of generally tubular shape. The elastic sleeve is configured to be concentrically arranged around the cable such that it is in fixed sealing contact with the cable in a first cable sealing portion of the elastic sleeve, and to be concentrically arranged around the spreader in a central sealing portion of the elastic sleeve that is axially offset from the first cable sealing portion, and a first flexible membrane portion disposed between the first cable sealing portion and the central sealing portion. The spreading member is maintained in a fixed position relative when assembled into the connector housing such that the central sealing portion is in sealing contact with the connector housing.

The kit of parts can also include an connector housing extension that is attachable to the second end of the connector housing and an inter housing sealing member disposed between the connector housing and the connector housing extension unit and a bend control member that is attachable to attached to the second end of the connector housing or to a second end of the connector housing extension unit.

The exemplary cable sealing member has better sealing performance when used in a sealed optical fiber connector than a standard grommet in applications where the cable terminated by the connector is not fixed with respect to the connector housing. The exemplary cable sealing device allows the cable to move when subjected to an external force or forces due to contraction and expansion of the cable jacket with temperature without disrupting the seal between the cable and the connector housing.

Advantageously, the exemplary ruggedized connector described herein has a modular design that enables the use of the housing with either a factory mount connection portion or a field mountable connection portion because connection portion of the connector is designed to be compatible with standard optical fiber connection formats, such as the standard SC-format. In fact, applicants' ruggedized connector housing can be used with the backbone of any standard SC-type connector and can be installed in the field or on-site or in the factory. In particular, the exemplary connector is designed to work with connection portions having floating ferrules which improves mechanical isolation of the ferrule from loads placed on the external connector housing. Additionally, the exemplary connector allows an end-customer to purchase standard, not ruggedized SC-terminated drop cables (or even un-terminated cables) from any vendor, and allows the customer install/transform a standard optical fiber connector into a ruggedized connector on-site in the field.

In one aspect the exemplary optical fiber connector can be field terminated by utilizing a suitable field mountable optical connection portion. In another aspect, the exemplary optical fiber connector can be factory mounted utilizing a factory mounted connection portion. In addition, the exemplary optical fiber connector can be assembled on the end of a pre-terminated cable by incorporating the pre-terminated optical connection structure into the exemplary optical fiber connector disclosed herein.

The exemplary port adapter enables the use of the exemplary sealed connector with a variety of port structures in conventional enclosures or bulk heads. This means that the port adapter enables retrofitting or use of connectorized drop cables in empty ports of the large installed base of existing telecommunication enclosures in the field. The port adapter holds a standard connector coupling adjacent to the port structure allowing external blind mating of the sealed optical connector of the present disclosure and the standard optical fiber connector. The keying system between the sealed optical fiber connector and the port adapter, the sealed optical fiber connector and the coupling and the port adapter with the port structure ensure proper positioning of the optical fiber with the connector, essentially eliminating the possibility of misalignment of the sealed optical fiber connector with the coupling.

Although specific embodiments have been illustrated and described herein for purposes of description of the preferred embodiment, it will be appreciated by those of ordinary skill in the art that a wide variety of alternate or equivalent implementations may be substituted for the specific embodiments shown and described without departing from the scope of the present invention. Those with skill in the art will readily appreciate that the present invention may be implemented in a very wide variety of embodiments. This application is intended to cover any adaptations or variations of the embodiments discussed herein.

What is claimed is:

1. A cable sealing device for a sealed optical fiber connector, comprising:
    a cable defining axial and radial directions;
    a spreading member arranged around the cable and axially movable relative to the cable; and
    an elastic sleeve concentrically disposed around the cable and over the spreading member, wherein a first cable sealing portion of the elastic sleeve is in fixed sealing contact with the cable, a central sealing portion of the elastic sleeve that is axially offset from the first cable sealing portion and concentrically arranged around the spreading member, and a first flexible membrane portion disposed between the first cable sealing portion and the central sealing portion,
    wherein the spreading member is maintained in a fixed position relative to a connector housing of the sealed optical fiber connector such that the central sealing portion is in sealing contact with the connector housing, wherein the elastic sleeve further comprises a second cable sealing portion adjacent to the second end of the elastic sleeve that is in fixed sealing contact with the cable, and a second flexible membrane portion disposed between the second cable sealing portion and the central sealing portion.

2. The device of claim 1, wherein the spreading element is a rigid washer.

3. The device of claim 2, wherein the rigid washer is made of at least two parts that snap together to form said rigid washer.

4. The device of claim 2, wherein rigid washer is made of either a rigid plastic or metal.

5. The device of claim 1, wherein the elastic sleeve is formed from an elastomeric material.

6. The device of claim 1, wherein the elastic sleeve is formed from polychloroprene rubber.

7. The device of claim 1, wherein the elastic sleeve is formed from silicone rubber.

8. A sealed optical fiber connector, comprising:
    a connector housing having an interior cavity extending from a first end to a second end of the connector housing and a shell portion integrally formed at the first end of the connector housing;

an optical connection portion mounted on a terminal end of an optical fiber cable and secured in the shell portion of the connector housing; and a cable sealing member disposed on the cable adjacent to the optical connection portion, wherein the cable sealing member comprises a spreading member arranged around the cable and axially movable relative to the cable; and an elastic sleeve concentrically disposed around the cable and over the spreading member, wherein a first cable sealing portion of the elastic sleeve is in fixed sealing contact with the cable, a central sealing portion of the elastic sleeve that is axially offset from the first cable sealing portion and concentrically arranged around the spreading member, and a first flexible membrane portion disposed between the first cable sealing portion and the central sealing portion, wherein the spreading member is maintained in a fixed position relative to the connector housing such that the central sealing portion is in sealing contact with the connector housing.

9. The connector of claim 8, wherein the connector includes a first keying mechanism on the shell portion of the housing that is configured to mate with a standard optical fiber coupling and a second keying mechanism on the connector housing to key the connector to a port structure of a bulkhead or a telecommunications enclosure.

10. The connector of claim 8, wherein the cable sealing member is characterized by a maximum outer diameter and wherein the maximum outer diameter is greater than an inner diameter of the cavity into which it is inserted.

11. The connector of claim 10, wherein the elastic sleeve has a sleeve wall that is characterized by a wall thickness when it is disposed over the spreading member and wherein the sleeve wall is compressed when it is inserted into the cavity of the connector housing.

12. The connector of claim 8, wherein the connector is mounted on a terminal end of an optical fiber cable in the factory and wherein the optical fiber connection portion is secured to the optical fiber cable by an adhesive.

13. The connector of claim 8, wherein the connector is mounted on a terminal end of an optical fiber cable in the field and wherein the optical fiber connection portion is mechanically secured to the optical fiber cable.

14. The connector of claim 8, wherein the connection portion is fixed with respect to the connector housing, but where the optical fiber cable terminated by the connector can move axially with respect to the connector housing.

15. The connector of claim 8, where in the connector further comprises a bend control member attached to a second end of the connector housing.

16. The connector of claim 8, further comprising an connector housing extension unit attached to the second end of the connector housing and an inter housing sealing member disposed between the connector housing and the connector housing extension unit.

17. The connector of claim 16, where in the connector further comprises a bend control member attached to a second end of the connector housing extension unit.

18. A system for making a sealed optical connection through a bulkhead, comprising:

the bulkhead having at least one port structure disposed therein;

the sealed optical fiber connector comprising a connector housing having an interior cavity extending from a first end to a second end of the connector housing and a shell portion integrally formed at the first end of the connector housing;

an optical connection portion mounted on a terminal end of an optical fiber cable and secured in the shell portion of the connector housing; and a cable sealing member disposed on the cable adjacent to the optical connection portion, wherein the cable sealing member comprises a spreading member arranged around the cable and axially movable relative to the cable; and an elastic sleeve concentrically disposed around the cable and over the spreading member, wherein a first cable sealing portion of the elastic sleeve is in fixed sealing contact with the cable, a central sealing portion of the elastic sleeve that is axially offset from the first cable sealing portion and concentrically arranged around the spreading member, and a first flexible membrane portion disposed between the first cable sealing portion and the central sealing portion, wherein the spreading member is maintained in a fixed position relative to the connector housing such that the central sealing portion is in sealing contact with the connector housing.

* * * * *

UNITED STATES PATENT AND TRADEMARK OFFICE
CERTIFICATE OF CORRECTION

PATENT NO. : 9,817,195 B2
APPLICATION NO. : 15/257034
DATED : November 14, 2017
INVENTOR(S) : Michel Menguy et al.

Page 1 of 1

It is certified that error appears in the above-identified patent and that said Letters Patent is hereby corrected as shown below:

On the Title Page

Item (71), Applicant, delete "BM" and insert -- 3M -- therefor.

Signed and Sealed this
Twenty-second Day of May, 2018

Andrei Iancu
*Director of the United States Patent and Trademark Office*